United States Patent [19]
Butani et al.

[11] Patent Number: 5,297,198
[45] Date of Patent: Mar. 22, 1994

[54] TWO-WAY VOICE COMMUNICATION METHODS AND APPARATUS

[75] Inventors: Chandru T. Butani, East Hanover; Joseph R. Centurrino, Morris Plains; James F. Scheidemann, Wayne, all of N.J.

[73] Assignee: AT&T Bell Laboratories, Murray Hill, N.J.

[21] Appl. No.: 815,313

[22] Filed: Dec. 27, 1991

[51] Int. Cl.$^5$ ............................................. H04M 1/00
[52] U.S. Cl. .................................. 379/389; 379/390; 379/420; 379/402; 381/57
[58] Field of Search ............... 379/389, 390, 402, 404, 379/405, 419, 420; 381/57, 61

[56] References Cited

U.S. PATENT DOCUMENTS

| | | |
|---|---|---|
| 4,628,526 | 12/1986 | Germer ................................. 381/57 |
| 4,887,288 | 12/1989 | Erving . |
| 4,901,346 | 2/1990 | Erving . |
| 4,959,857 | 9/1990 | Erving et al. . |
| 4,965,822 | 10/1990 | Williams . |
| 5,007,046 | 4/1991 | Erving et al. . |
| 5,170,499 | 12/1992 | Grothause ........................ 381/57 X |

FOREIGN PATENT DOCUMENTS 0467256 1/1992 European Pat. Off. .............. 381/61

*Primary Examiner*—James L. Dwyer
*Assistant Examiner*—Paul A. Fournier
*Attorney, Agent, or Firm*—Ruloff F. Kip, Jr.

[57] ABSTRACT

A speakerphone system has a speaker and microphone in a common acoustic environment and electrically preceded and succeeded, respectively, by receive and transmit sections and adapted, respectively, to reproduce as sounds by such speaker signals passed through such receive section from a remote station, and to convert sounds sensed by such microphone into signals passed through such transmit section to such station. A computer derives from the signals from the microphone an electric quantity which is a measure of the average audible ambient noise level in such environment, and the computer uses such quantity as one factor among others in switching signal losses between such two sections so as to change the state of operation of the system between transmit and receive states. As an improvement, there is derived from such quantity a control signal which effects dynamic adjustment of the gain in the receive section so that the average level of the sounds reproduced by the speaker will increase as such noise level increases, and conversely (Automatic Level Control). Other improvements are to provide for the system(a) a plurality of individually selectable interface circuits for matching the system to differently designed two-way voice communication channels in the outside world, (b) an auxiliary microphone for picking up voice sounds in the environment to be reproduced by the speaker, (c) an additional speaker not subject to automatic level control, and (d) sound tones produced under manual control in the environment by the system either to aid an installer in adjusting the system or to provide a reminder that the system is "on."

7 Claims, 9 Drawing Sheets

USER INTERFACE

TX - RX STATE DIAGRAM

SPEECH GAIN vs. AMBIENT NOISE
CONSTANT INTELLIGIBILITY CURVE ns picked up by the speakerphone microphone from its environment (the "transmit signal average") is compared to such noise average, and the exceeding by such signal average of such noise average by more than a certain threshold, is a factor which, among others, tends to induce switching from the idle to the transmit state. Similar exceeding by the transmit signal average of the transmit noise average by more than a threshold when the speakerphone is in, respectively, the transmit state and the receive state are factors which, among others, tend, respectively, to induce retaining of the speakerphone in the transmit state, and the switching of the speakerphone from the receive state to the transmit state.

In all of the above cases, however, the transmit noise average has no first order effect on the level of the voice sounds reproduced by the speaker element of the speakerphone. Consequently, with progressive increase in the average ambient noise level of the acoustic environment of that speaker element, the reproduced voice signals tend to become less and less intelligible.

TWO-WAY VOICE COMMUNICATION METHODS AND APPARATUS

FIELD OF THE INVENTION

This invention relates generally to methods and apparatus for providing two-way voice communication between an acoustic environment in which voice signals are reproduced as sound and a station remote from such environment and from which such voice signals originate. More particularly, this invention relates to methods and apparatus of such kind in which the level of such sound is controlled as a function of the ambient noise in such environment so as to, over a range, increase when such noise increases, and conversely.

BACKGROUND OF THE INVENTION

U.S. Pat. No. 5,007,046 issued Apr. 9, 1991 in the name of Richard H. Erving et al for Computer Controlled Adaptive Speakerphone and assigned to the assignee hereof and incorporated herein by reference and made a part hereof (the "'046 patent") discloses a speakerphone adapted to be in an idle state, a transmit state or a receive state, and to switch from any one of such states to either of the other two states. The same speakerphone is also disclosed in U.S. Pat. No. 4,959,857, U.S. Pat. Nos. 4,901,346 and 4,887,288, each assigned to the assignee hereof, but it will be discussed herein with reference to its disclosure in the '046 patent.

The speakerphone disclosed in that patent, under the control of, for example, a computer, measures the energy of the incoming transmit and receive signals and also develops information about the signal and noise levels for self calibration and efficient operation. This information is obtained for the computer illustratively by pre-processing analog circuitry and an analog-to-digital converter. The analog circuitry converts the incoming transmit and receive signals into a signal that tracks the envelope of the audio. This envelope information is then amplified by a logarithmic amplifier which greatly expands the dynamic operating range of the speakerphone. The resulting analog signals are passed to the analog-to-digital converter which periodically presents the computer with digital information corresponding to the logarithm of the amplitude of the envelope of the signals.

This digital information is used by the computer to develop several different audio signal averages. A transmit signal average and a receive signal average are developed by averaging samples of these signals in a manner that recognizes peaks in the applied signals. Since speech tends to have many peaks rather than a constant level, this averaging technique favors detecting speech.

A transmit noise average and a receive noise average are also developed. The transmit noise average is representative of the noise level of the operating environment for the speakerphone. The receive noise average measures the noise level on the line from the far end party. The transmit noise average and the receive noise average are both developed by measuring the lowest level seen by the analog-to-digital converter. Since background noise is generally constant, the lowest level samples provide a reasonable estimate of the noise level.

The transmit noise average is used in various ways in the operation of the speakerphone of the '046 patent (the "'046 speakerphone"). When the speakerphone is in its idle state, an average of the audio informational sig-

SUMMARY OF THE INVENTION

The foregoing disadvantage is overcome according to the present invention in one of its aspects by the method comprising, providing at a local site a handsfree speaker and handsfree microphone in a common acoustic environment for utilization of said speaker and microphone, respectively, to reproduce as sound in said environment electrical voice signals received from a remote station outside said environment ("receive signals") and applied to said speaker, and to reproduce voice sounds of people at said site as electrical voice signals to be transmitted to said station, electrically processing said receive signals before their application to said speaker by passing them through an electrical receive section, developing via said microphone from audio acoustic energy in said environment a composite signal comprising first and second components representative of, respectively, ambient noise in said environment, and voice sounds present from time to time therein, electrically analyzing such composite signal to provide, as a differential electrical response to said components, an electrical quantity which discriminates in favor of and against, respectively, said first and said second components, and which is a relatively significant measure of the average level of such noise while being relatively unaffected in value by the presence or absence of such voice sounds, deriving from such quantity a control signal, and dynamically adjusting by said control signal the gain provided in said receive section for said receive signals so as, over a range, to increase and decrease the value of such gain when, respectively, said noise increases and said noise decreases. By the use of such method it is possible to maintain over a range substantially constant intelligibility of the voice sounds reproduced in the environment by the speaker as the level of the ambient noise therein increases while, conversely, it is possible to reduce such voice sounds to levels which are more pleasing when such ambient noise level decreases.

BRIEF DESCRIPTION OF THE DRAWING

For a better understanding of the invention, reference is made to the following description of exemplary embodiments thereof, and to the accompanying drawings wherein.

In the disclosure which follows, the term "gain" is used in the opposite sense to "loss". That is, a positive gain is a negative loss, and conversely.

DETAILED DESCRIPTION

Figure 1:
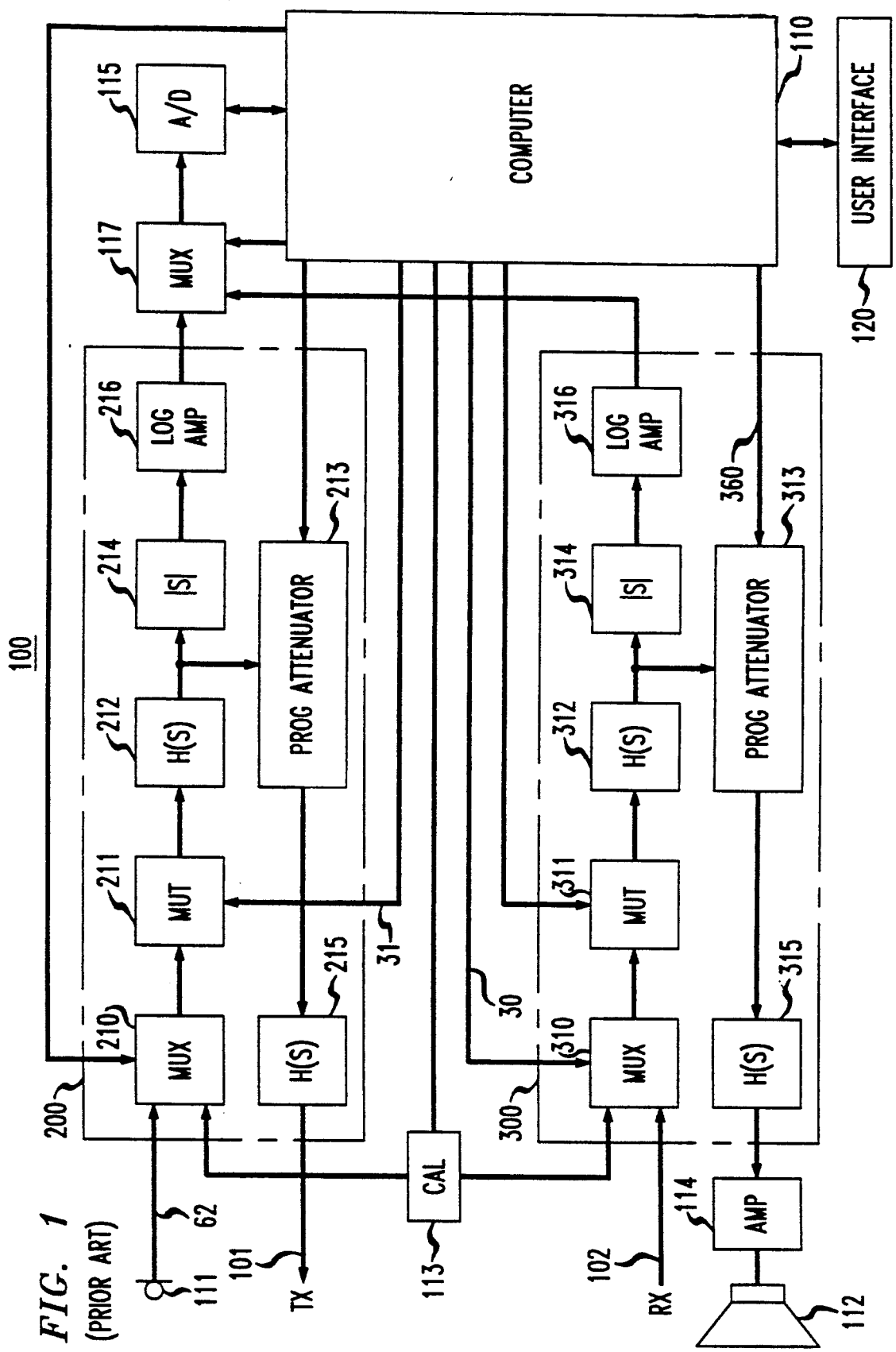
FIG. 1 is a block diagram of the two-way speakerphone device which is disclosed in the '046 patent, and in which is incorporated one or more of the improvements according to the present invention.

FIG. 1 is a functional block representation of the computer controlled prior art adaptive speakerphone 100 which is disclosed in the '046 patent. As shown, the speakerphone generally comprises a transmit section 200, a receive section 300, and a computer 110. A microcomputer commercially available from Intel Corporation as Part No. 8051 may be used for computer 110 with the proper programming. A microphone 111 couples audio signals to the speakerphone and a speaker 112 receives output audio signals from the speakerphone.

By way of operation through illustration, an audio signal provided by a person speaking into the microphone 111 is coupled into the transmit section 200 to a multiplexer 210. In addition to being able to select the microphone speech signal as an input, the multiplexer 210 may also select calibration tones as its input. These calibration tones are provided by a calibration circuit 113 and are used, in this instance, for calibration of the hardware circuitry in the transmit section 200. Circuit 113 is also referred to herein as a signal generator circuit (FIG. 2) since, according to the invention hereof, circuit 113 is used for purposes in addition to calibration.

Figure 6:
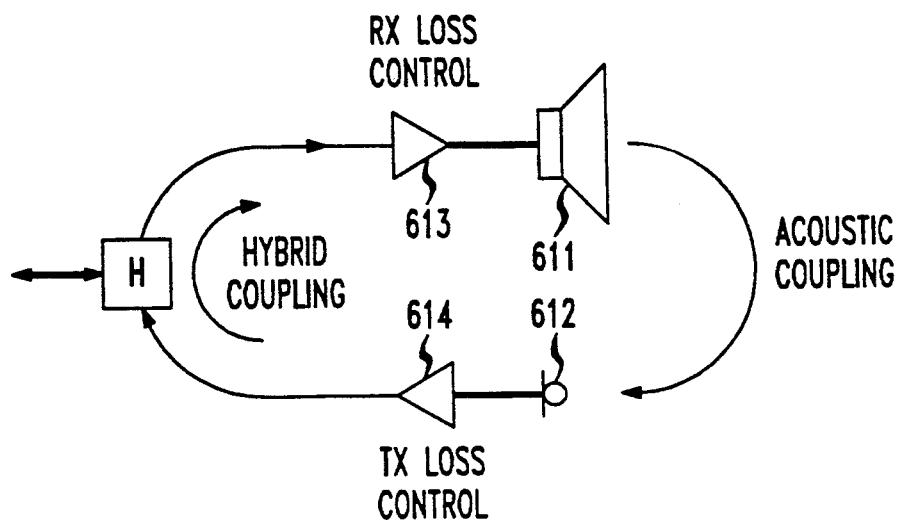
FIG. 6 depicts a general speakerphone circuit and two types of coupling that most affect its operation.

Connected to the multiplexer 210 is a mute control 211 which mutes the transmit path in response to a control signal from the computer 110. A high pass filter 212 connects to the mute control 211 to remove the room and low frequency background noise in the speech signal. The output of the high pass filter 212 is coupled both to a programmable attenuator 213 and to an envelope detector 214. In response to a control signal from the computer 110, the programmable attenuator 213 inserts loss in the speech signal in three and one half dB steps up to a total of sixteen steps, providing 56 dB of total loss. This signal from the programmable attenuator 213 is coupled to a low pass filter 215 which removes any spikes that might have been generated by the switching occurring in the attenuator 213. This filter also provides additional signal shaping to the signal before the signal is transmitted by the speakerphone over audio line 101 to a hybrid 610 (FIG. 6). After passing through the envelope detector 214, the speech signal from the filter 212 is coupled to a logarithmic amplifier 216, which expands the dynamic range of the speakerphone to approximately 60 dB for following the envelope of the speech signal.

The receive section 300 contains speech processing circuitry that is functionally the same as that found in the transmit section 200. A speech signal received over an input audio line 102 from the hybrid 610 is coupled into the receive section 300 to the multiplexer 310. Like the multiplexer 210, the multiplexer 310 may also select calibration tones for its input, which are provided by the calibration circuit 113. Connected to the multiplexer 310 is a mute control 311 which mutes the receive path in response to a control signal from the computer 110. A high pass filter 312 is connected to the mute control 311 to remove the low frequency background noise from the speech signal.

The output of the high pass filter 312 is coupled both to an envelope detector 314 and to a programmable attenuator 313. The envelope detector 314 obtains the signal envelope for the speech signal which is then coupled to a logarithmic amplifier 316. This amplifier expands the dynamic range of the speakerphone to approximately 60 dB for following the envelope of the receive speech signal. The programmable attenuator 313, responsive to a control signal from the computer 110, inserts loss in the speech signal in three and one half dB steps in sixteen steps, for 56 dB of loss. This signal from the programmable attenuator 313 is coupled to a low pass filter 315 which removes any spikes that might have been generated by the switching occurring in the attenuator 313. This filter also provides additional signal shaping to the signal before the signal is coupled to the loudspeaker 112 via an amplifier 114.

The signals from both the logarithmic amplifier 216 and the logarithmic amplifier 316 are multiplexed into an eight-bit analog-to-digital converter 115 by a multiplexer 117. The converter 115 presents the computer 110 with digital information about the signal levels every 750 microseconds.

The computer 110 measures the energy of the incoming signals and develops information about the signal and noise levels. Both a transmit signal average and a receive signal average are developed by averaging samples of each signal according to the following equation:

$$\hat{y}_t = \begin{cases} \hat{y}_{t-1} + \frac{s_t - \hat{y}_{t-1}}{4} & \text{if } s_t \geq \hat{y}_{t-1} \\ \hat{y}_{t-1} + \frac{s_t - \hat{y}_{t-1}}{32} & \text{if } s_t < \hat{y}_{t-1} \end{cases}$$

where
Sampling rate = 1333 per second
$s_t$ = new sample
$\hat{y}_{t-1}$ = old average
$\hat{y}_t$ = new average This averaging technique tends to pick out peaks in the signal applied. Since speech tends to have many peaks rather than a constant level, this average favors detecting speech.

Both a transmit noise average and a receive noise average are also developed. The transmit noise average determines the noise level of the operating environment of the speakerphone. The receive noise average measures the noise level on the line from the far-end party. The transmit noise average and the receive noise average are both developed by measuring the lowest level seen by the converter 115. Since background noise is generally constant, the lowest samples provide a reasonable estimate of the noise level. The transmit and receive noise averages are developed using the following equation:

$$y_t = \begin{cases} \hat{y}_{t-1} + \frac{s_t - \hat{y}_{t-1}}{4096} & \text{if } s_t \geq \hat{y}_{t-1} \\ \hat{y}_{t-1} + \frac{s_t - \hat{y}_{t-1}}{4} & \text{if } s_t < \hat{y}_{t-1} \end{cases}$$

where
Sampling rate = 1333 per second
$s_t$ = new sample
$\hat{y}_{t-1}$ = old average
$\hat{y}_t$ = new average This equation strongly favors minimum values of the envelope of the applied signal, yet still provides a path for the resulting average to rise when faced with a noisier environment.

Two other signal levels are developed to keep track of the loop gain, which affects the switching response and singing margin of the speakerphone. These signal levels are the speech level that is present after being attenuated by the transmit attentuator 213 and the speech level that is present after being attentuated by the receive attenuator 313. In the speakerphone, these two levels are inherently known due to the fact that the computer 110 directly controls the loss in the attenuators 213 and 313 in discrete amounts, 3.5 dB steps with a maximum loss of 56 dB in each attenuator. All of these levels are developed to provide the computer 110 with accurate and updated information about what the current state of the speakerphone should be.

As in all speakerphones, the adaptive speakerphone needs to use thresholds to determine its state. Unlike its analog predecessors, however, those thresholds need not be constant. The computer 110 has the ability to recalibrate itself to counteract variation and aging of hardware circuitry in the speakerphone. This is achieved by passing a first and a second computer-generated test tone through the transmit path and the receive path of the hardware circuitry and measuring both responses.

These test tones are generated at a zero dB level and a minus 20 dB level. The difference measured between the zero dB level tone and the minus 20 dB level tone that passes through the speakerphone circuitry is used as a base line for setting up the thresholds in the speakerphone. First, by way of example, the zero dB level tone is applied to the transmit path via multiplexer 210 and that response measured by the computer 110. Then the minus 20 dB tone is similarly applied to the transmit path via multiplexer 210 and its response measured by the computer. The difference between the two responses is used by the computer as a basic constant of proportionally that represents "20 dB" of difference in the transmit path circuitry. This same measurement is similarly performed on the receive path circuitry by applying the two test tones via multiplexer 310 to the receive path. Thus, a constant of proportionality is also obtained for this path. The number measured for the receive path may be different from the number measured by the transmit path due to hardware component variations. The computer simply stores the respective number for the appropriate path with an assigned value of minus 20 dB to each number. Once the computer has determined the number representing minus 20 dB for each path, it is then able to set the required dB threshold levels in each path that are proportionally scaled to that path's number. Also, because of the relative scaling, the common thresholds that are set up in each path always will be essentially equal even though the values of corresponding circuit components in the paths may differ considerably.

As part of the calibration process, the speakerphone also measures the acoustics of the room in which it operates. Through use of the calibration circuit 113, the speakerphone generates a series of eight millisecond tone bursts throughout the audible frequency of interest and uses these in determining the time-domain acoustic response of the room. Each tone burst is sent from the calibration circuit 113 through the receive section 300 and out the leadspeaker 112. The integrated response, which is reflective of the echoes in the room from each tone burst, is picked up by the microphone 111 and coupled via the transmit section 200 to the computer 110 where it is stored as a composite response pattern. A more detailed description of such pattern appears in the '046 patent. This response is characterized by two important factors: the maximum amplitude of the returned signal, and the duration of the echoes. The amplitude of the returned signal determines what level of transmit speech will be required to break in on receive speech. The greater the acoustic return, the higher that threshold must be to protect against self-switching. The duration of the echoes determine how quickly speech energy injected into the room will dissipate, which controls how fast the speakerphone can switch from a receive to a transmit state. If the room acoustics are harsh, therefore, the speakerphone adapts by keeping switching response on a par with that of a typical analog device. But when acoustics are favorable, it speeds up the switching time and lowers break in thresholds to provide a noticeable improvement in performance.

The concept of self-calibration is also applied to the speakerphone's interface to a hybrid. During a conversation, the computer measures the degree of hybrid reflection that it sees. This hybrid reflection provides a measure of both the hybrid and far-end acoustic return. Its average value is determined using the following equation:

$$\hat{H}_t = \begin{cases} \hat{H}_{t-1} + \dfrac{(\hat{R}_t - \hat{T}_t) - \hat{H}_{t-1}}{4096} & \text{if } (\hat{R}_t - \hat{T}_t) \geq \hat{H}_{t-1} \\ \hat{H}_{t-1} + \dfrac{(\hat{R}_t - \hat{T}_t) - \hat{H}_{t-1}}{4} & \text{if } (\hat{R}_t - \hat{T}_t) < \hat{H}_{t-1} \end{cases}$$

where
Sampling rate = 1333 per second
$\hat{R}_t$ = receive signal average
$\hat{T}_t$ = transmit signal average
$\hat{H}_{t-1}$ = old hybrid average
$\hat{H}$ = new hybrid average This equation develops the hybrid average value by subtracting a transmit signal from a receive signal and then averaging these signals in a manner that favors the maximum difference between them. The receive signal is that signal provided to the speakerphone by the hybrid on the receive line and the transmit signal is that signal provided to the hybrid by the speakerphone on the transmit line. By developing an estimate of the hybrid average, the amount of switched loss required in the speakerphone to maintain stability may be raised or lowered. By lowering the amount of switched loss, speakerphone switching operation becomes more transparent and can even approach full-duplex for fully digital connections.

The estimate of the hybrid average is also used to determine the switching threshold level of the speakerphone in switching from the transmit state to the receive state (receive break in). Since the estimate of the hybrid average is used to develop an expected level of receive speech due to reflection, additional receive speech due to the far-end talker may be accurately determined and the state of the speakerphone switched accordingly.

To obtain an accurate representation of the line conditions, hybrid averaging is performed only while the speakerphone is in the transmit state. This insures that receive speech on the receive line during a quiet transmit interval cannot be mistaken for a high level of hybrid return. This averaging therefore prevents receive speech, that is not great enough to cause the speakerphone to go into the receive state, from distorting the estimated hybrid average.

Another boundary condition employed in developing this hybrid average is a limitation on the acceptable rate of change of transmit speech. If transmit speech ramps up quickly, then the possibility of sampling errors increases. To avoid this potential source of errors, the hybrid average is only developed during relatively flat intervals of transmit speech (the exact slope is implementation-dependent).

To ensure stable operation with an adaptive speakerphone in use at both the near-end and the far-end by both parties, the amount that the hybrid average may improve during any given transmit interval is also limited. In the adaptive speakerphone 100, for example, the hybrid average is allowed to improve no more than 5 dB during each transmit state. In order for the hybrid average to improve further, a transition to receive and then back to transmit must be made. This insures that the far-end speakerphone has also had an opportunity to go into the transmit state and has similarly adapted. Thus, each speakerphone is able to reduce its inserted loss down to a point of balance in a monotonic fashion. Limiting the amount of change in the hybrid average during a transmit interval also allows this speakerphone to be operable with other adaptive speakerphones such as echo-cancelling speakerphones that present a varying amount of far-end echo as they adapt.

For ease of operation and for configuring the speakerphone, a user interface 120 through which the user has control over speakerphone functions is provided internal to the speakerphone 100. Such user interface is comprised in part in the FIG. 2 system of a control panel 40 (FIG. 3).

Figure 4:
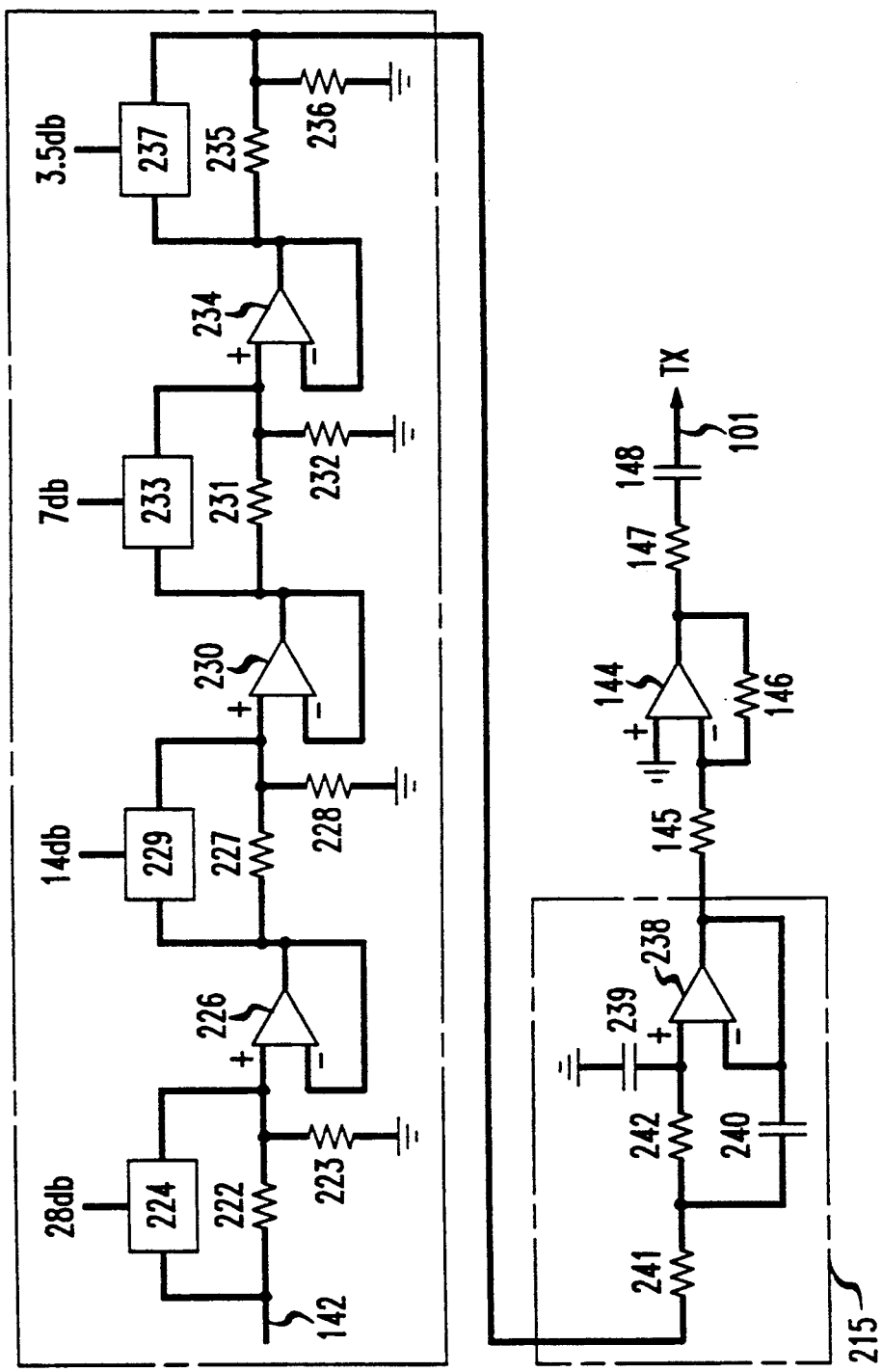
FIG. 4 is a schematic of a programmable attenuator and a low pass filter employed in a transmit section of the FIG. 1 and FIG. 2 systems.

Referring now to FIG. 4, there is shown a detail schematic of the programmable attenuator 213. This attenuator comprises multiple sections which are formed by passing the output of an amplifier in one section through a switchable voltage divider and then into the input of another amplifier. The signal on line 142 from the high pass filter 212 is coupled directly to a first section of the attenuator 213 comprising a voltage divider consisting of resistors 222 and 223, a switch 224 and a follower amplifier 226. When the switch 224 is closed shorting resistor 222, the voltage developed across the voltage divider essentially will be the original input voltage, all of which develops across resistor 223. Once the switch is opened, in response to a command from the computer 110, the signal developed at the juncture of resistors 222 and 223 is reduced from that of the original input voltage level to the desired lower level. The loss is inserted in each section of the attenuator in this manner.

Thus in operation, a speech signal passing through the first section of the attenuator is either passed at the original voltage level or attenuated by 28 dB. If the switch is turned on, i.e., the resistor 222 shorted out, then no loss is inserted. If the switch is turned off, then 28 dB of loss is inserted. The signal then goes through a second similar section which has 14 dB of loss. This second section of the attenuator 213 comprises a voltage divider consisting of resistors 227 and 228, a switch 229 and a follower amplifier 230. This second section is followed by a third section which has 7 dB of loss. This third section of the attenuator 213 comprises a voltage divider consisting of resistors 231 and 232, a switch 233 and a follower amplifier 234. A fourth and final section has 3½ dB of loss. This final section of the attenuator 213 comprises resistors 235 and 236 and a switch 237. By selecting the proper combination of on/off values for switches 224, 229, 233 and 237, the computer 110 may select from 0 to 56 dB of loss in 3½ dB increments. It should be understood that if a finer control of this attenuator is desired such that it could select attenuation in 1.75 dB increments, it is but a simple matter for one skilled in the art, in view of the above teachings, to add another section to the attenuator thereby providing this level of control.

This signal from the programmable attenuator 213 is coupled to the low pass filter 215 which provides additional shaping to the transmit signal. Low pass filter 215 comprises a follower amplifier 238, and associated circuitry comprising capacitors 239 and 240, and resistors 241 and 242. The output of filter 215 is coupled to a transmit audio output level conversion circuit, comprising amplifier 144, resistors 145, 146 and 147, and also capacitor 148, for connection to the audio output line 101. This output level conversion circuit provides an output impedance of 600 ohms for matching to the output line 101.

Figure 5:
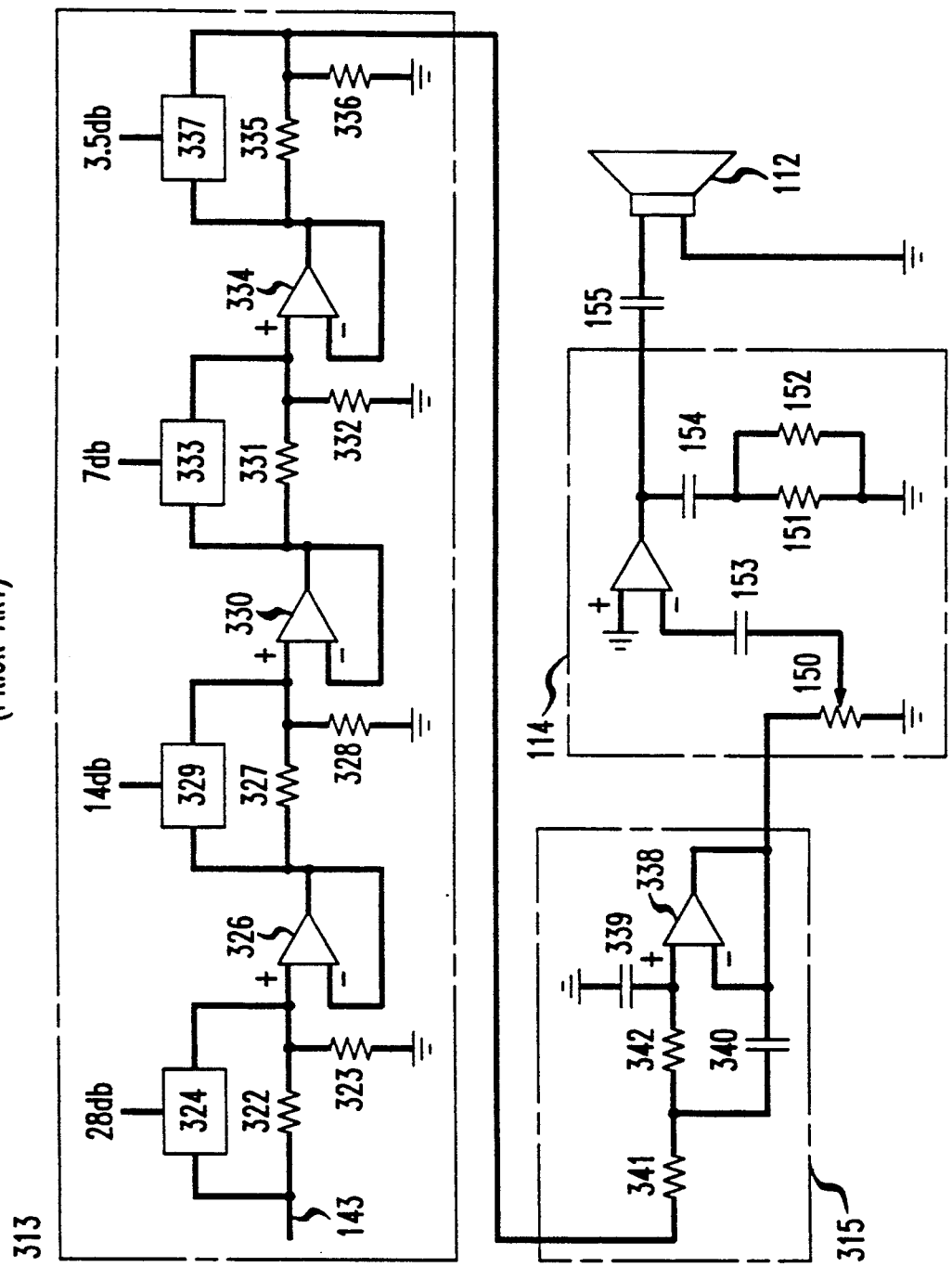
FIG. 5 is a schematic of a programmable attenuator and a low pass filter employed in a receive section of the FIG. 1 and FIG. 2 systems.

Referring now to FIG. 5, there is shown a detail schematic for the programmable attenuator 313, the low pass filter 315 and the amplifier 114 for the loudspeaker 112. The same basic components are used in implementing the programmable attenuator 313 and the programmable attenuator 213. Because of this and the detailed description given to attenuator 213, this attenuator 313 will not be described in similar detail.

Follower amplifiers 326, 330 and 334 along with resistors 322, 323, 327, 328, 331, 332, 335 and 336, and also switches 324, 329, 333 and 337 combine in forming the four sections of the attenuator 313. As in attenuator 213, a speech signal is attenuated 28 dB by section one, 14 dB by section two and 7 dB and 3½ dB by sections three and four respectively.

The signal from the programmable attenuator 313 is coupled to the low pass filter 315 which provides additional shaping to the receive signal. Low pass filter 315 comprises a follower amplifier 338, and associated circuitry including capacitors 339 and 340, and resistors 341 and 342. In amplifier 114, an amplifier unit 149 and associated circuitry, variable resistor 150, resistors 151 and 152, and capacitors 153 and 154, provide gain for the output signal from low pass filter 315 before coupling this signal to the speaker 112 via a capacitor 155.

Further details of the FIG. 1 speakerphone are disclosed in the '046 patent.

With reference to FIG. 6, there is shown a general speakerphone circuit 600 for describing the two types of coupling, hybrid and acoustic, that most affect the operation of a speakerphone being employed in a telephone connection. A hybrid 610 connects the transmit and receive paths of the speakerphone to a telephone line whose impedance may vary depending upon, for example, its length from a central office, as well as, for example, other hybrids in the connection. And the hybrid only provides a best case approximation to a perfect impedance match to this line. Thus a part of the signal on the transmit path to the hybrid returns over the receive path as hybrid coupling. With this limitation and the inevitable acoustic coupling between a loudspeaker 611 and a microphone 612, transmit and receive loss controls 613 and 614 are inserted in the appropriate paths to avoid degenerative feedback or singing.

Figure 7:
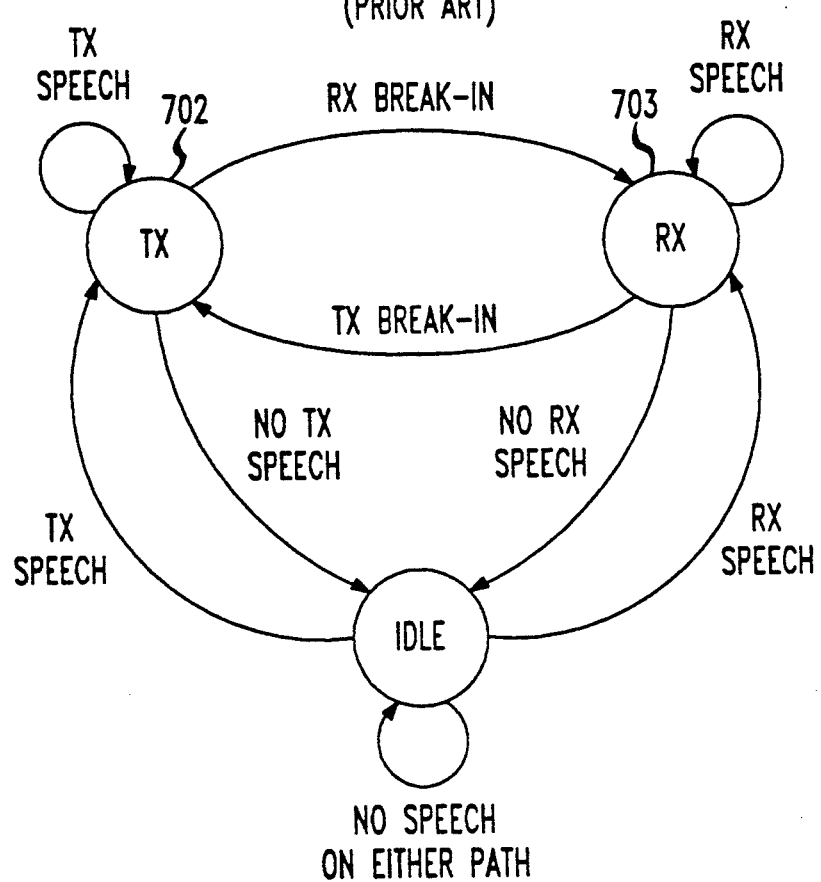
FIG. 7 is a state diagram depicting the three possible states of the speakerphone of FIG. 1.
Figure 8:
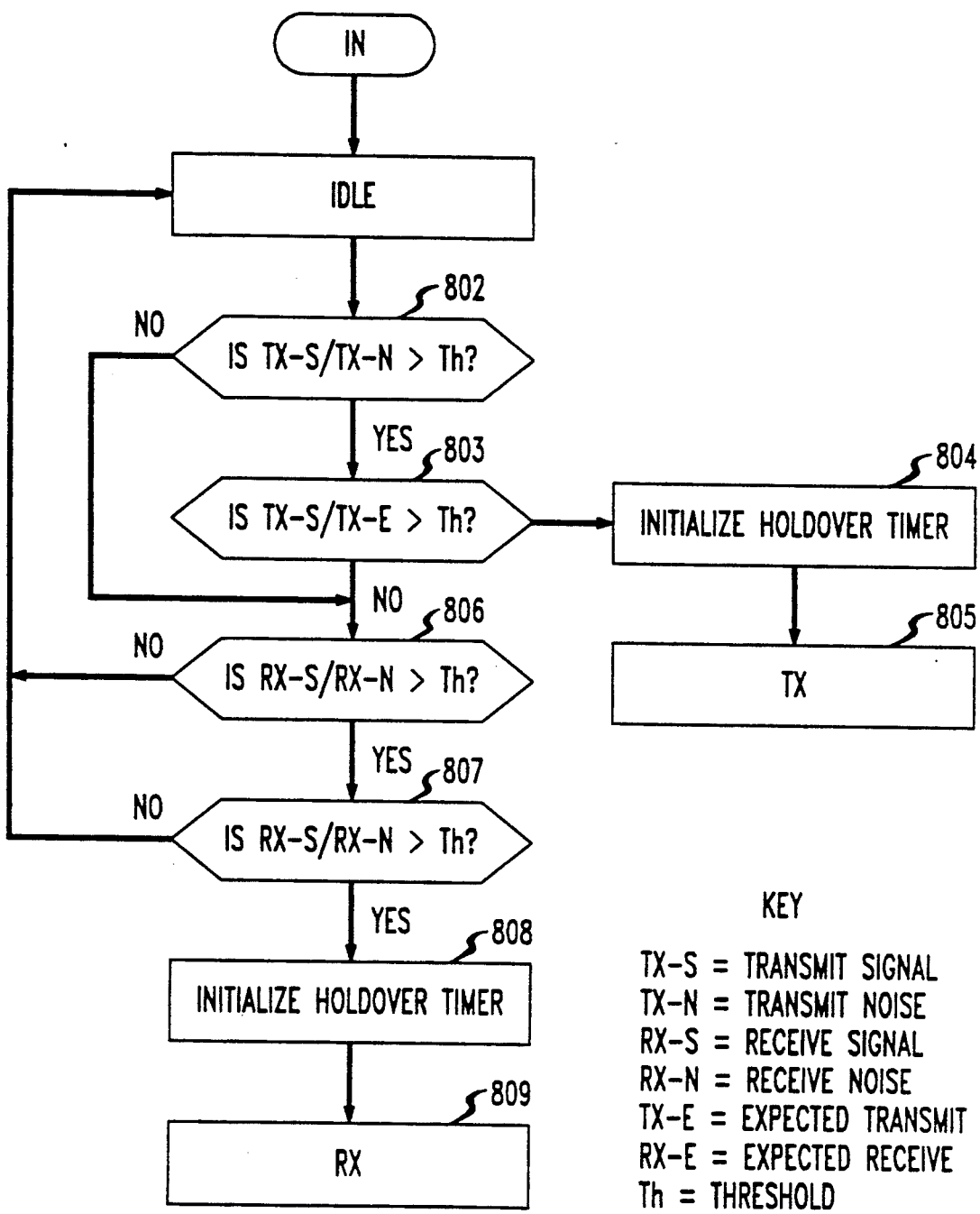
FIG. 8 depicts a flow chart illustrating the operation of the speakerphone of FIG. 1 in determining whether to remain in an idle state or move from the idle state to a transmit or a receive state.

In accordance with the invention, the computer controlled adaptive speakerphone 100 of FIG. 1 advantageously employs a process or program described herein with reference to a state diagram of FIG. 7 and the flow diagram of FIG. 8 for improved performance. This process dynamically adjusts the operational parameters of the speakerphone for the best possible performance in view of existing hybrid and acoustic coupling conditions.

Referring now to FIG. 7, there is shown the state diagram depicting the possible states of the speakerphone 100. The speakerphone initializes in an idle state 701. While in this state, the speakerphone has a symmetrical path for entering into either a transmit state 702 or a receive state 703, according to which of these two has the stronger signal. If there is no transmit or receive speech while the speakerphone is in the idle state 701, the speakerphone remains in this state as indicated by a loop out of and back into this idle state. Generally, if speech is detected in the transmit or receive path, the speakerphone moves to the corresponding transmit or receive state. If the speakerphone has moved to the transmit state 702, for example, and transmit speech continues to be detected, the speakerphone then remains in this state. If the speakerphone detects receive speech having a stronger signal than the transmit speech, a receive break-in occurs and the speakerphone moves to the receive state 703. If transmit speech ceases and no receive speech is present, the speakerphone returns to the idle state 701. Operation of the speakerphone in the receive state 703 is essentially the reverse of its operation in the transmit state 702. Thus if there is receive speech following the speakerphone moving to the receive state 703, the speakerphone stays in this state. If transmit speech successfully interrupts, however, the speakerphone goes into the transmit state 702. And if there is no receive speech while the speakerphone is in the receive state 703 and no transmit speech to interrupt, the speakerphone returns to the idle state.

Figure 9:
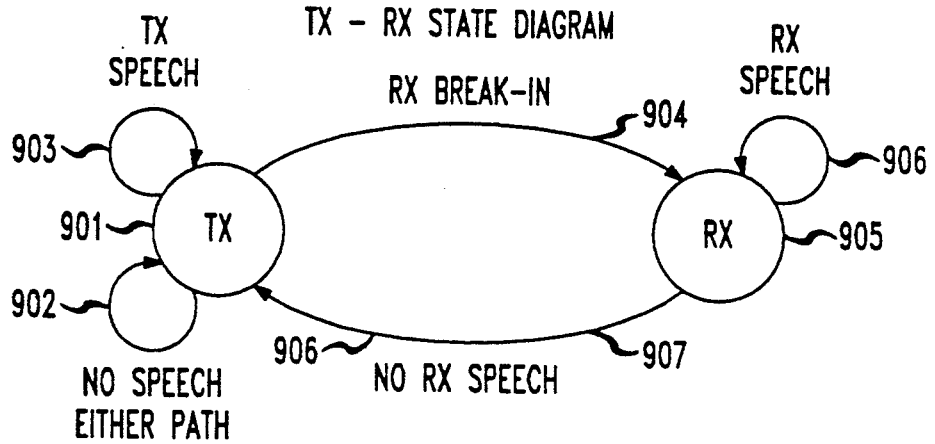
FIG. 9 is a modified state diagram showing a two-state mode of operation used in the FIG. 2 system and usable in other two-way voice communications system in various applications of the invention hereof.

In the modified speakerphone shown by FIGS. 2-5 and incorporating the inventive improvements hereof, the speakerphone's operation may have the three states depicted in FIG. 7. It is preferred, however, that such improved speakerphone have only transmit and receive states as depicted in FIG. 9. For such two state mode of operation, the transmit state 901 is the preferred state in which the speakerphone initializes and in or to which it will stay or return in the absence of both transmit and receive signals. If there is no transmit or receive speech while the speakerphone is in the state 901, the speaker phone remains in this state as indicated by a loop 902 out of and back into this state. If the speakerphone is in the transmit state, for example, and transmit speech occurs and continues to be detected as represented by loop 903, the speakerphone then remains in this state. If the speakerphone detects receive speech having a stronger signal than the transmit speech, a receive break-in occurs and the speakerphone moves as indicated by shift line 904 to the receive state 905. Operation of the speakerphone in the receive state is essentially the reverse of its operation in the transmit state. Thus, if there is receive speech following the speakerphone moving to the receive state as depicted by loop 906, the speakerphone stays in this state. If transmit speech successfully interrupts, however, the speakerphone goes, as depicted by shift line 907, into the transmit state 901. And if there is no receive speech while the speakerphone is in the receive state 905 and no transmit speech to interrupt, the speakerphone returns to the transmit state 901.

Referring now to the FIG. 1 speakerphone having three states of operation, there is shown in FIG. 8 a flow chart illustrating in greater detail the operation of the speakerphone 100 in determining whether to remain in the idle state or move from the idle state to the transmit state or receive state. The process is entered at step 801 wherein the speakerphone is in the idle state. From this step, the process advances to the decision 802 where it determines whether the detected transmit signal is greater than the transmit noise by a certain threshold. If the detected transmit signal is greater than the transmit noise by the desired amount, the process proceeds to decision 803. At this decision, a determination is made as to whether the detected transmit signal exceeds the expected transmit signal by a certain threshold.

The expected transmit signal is that component of the transmit signal that is due to the receive signal coupling from the loudspeaker to the microphone. This signal will vary based on the receive speech signal, the amount of switched loss, and the acoustics of the room as determined during the acoustic calibration process. The expected transmit level is used to guard against false switching that can result from room echoes; therefore, the transmit level must exceed the expected transmit level by a certain threshold in order for the speakerphone to switch into the transmit state.

If the detected transmit signal does not exceed the expected transmit signal by the threshold, the process advances to decision 806. If the detected transmit signal exceeds the expected transmit signal by the threshold, however, the process advances to step 804 where a holdover timer is initialized prior to the speakerphone entering the transmit state. Once activated, this timer keeps the speakerphone in either the transmit state or the receive state over a period of time, approximately 1.2 seconds, when there is no speech in the then selected state. This allows a suitable period for bridging the gap between syllables, words and phrases that occur in normal speech. From step 804 the process advances to step 805 where the speakerphone enters the transmit state.

Referring once again to step 802, if the detected transmit signal is not greater than the transmit noise by a certain threshold, then the process advances to the decision 806. In this decision, and also in decision 807, the receive path is examined in the same manner as the transmit path in decisions 802 and 803. In decision 806, the detected received signal is examined to determine if it is greater than the receive noise by a certain threshold. If the detected receive signal is not greater than the receive noise by this threshold, the process returns to the step 801 and the speakerphone remains in the idle state. If the detected receive signal is greater than the receive noise by the desired amount, the process proceeds to decision 807. At this decision, a determination is made as to whether the detected receive signal exceeds the expected receive signal by a certain threshold.

The expected receive signal represents the amount of speech seen on the receive line that is due to transmit speech coupled through the hybrid. This signal is calculated on an ongoing basis by the speakerphone and depends on the hybrid average, the amount of switched loss, and the transmit speech signal. Since the transmit speech path is open to some extent while the speakerphone is in the idle state, this causes a certain amount of hybrid reflection to occur, which, in turn, causes a certain amount of the speech signal detected on the receive path to be due to actual background noise or speech in the room. This, in turn, is read as a certain expected level of receive speech. And the actual receive speech signal must surpass this expected level by the threshold in order for the speakerphone to determine with certainty that there is actually a far-end party talking.

If the detected receive signal does not exceed the expected receive signal by the threshold, the process returns to the step 801 and the speakerphone remains in the idle state. If the detected receive signal exceeds the expected receive signal by the threshold, however, the process advances to step 808 where the holdover timer is initialized. From step 808 the process advances to step 809 where the speakerphone is directed to enter the receive state.

Once the speakerphone has assumed the transmit state as described in connection with FIG. 8, the processing continues to determine if the system should remain in the transmit state or switch to the receive state or the idle state. Similarly, if the system has assumed the receive state as described in connection with FIG. 8, the processing continues to determine if the system should remain in that state or switch to the transmit state or the idle states. In both instances one of the factors which affects the decisions made in the course of the processing is the value of the quantity TX-N (see FIG. 8) which is a measure of the ambient noise which is present in the environment of microphone 111 and is sensed thereby, and which is calculated by computer 110 as afore described. As part of such determinations, the average level of any transmit speech occurring is compared to TX-N, and decisions are made on the basis of whether or not such speech level exceeds TX-N by a certain threshold. For a better understanding of the steps occurring and the decisions made in the course of such processing when the FIG. 1 system is in the transmit state or the receive state, reference is made to the '046 patent. It suffices to say here that, if the system is a three state system as depicted in FIG. 7, the ambient noise level of the system's environment is, for whatever one of the three states that system is then in, one of the factors determinative of whether the system over time will remain in that state or shift to a different state. What has just been said for such three state system is true also for the two state system depicted in FIG. 9.

Figure 2:
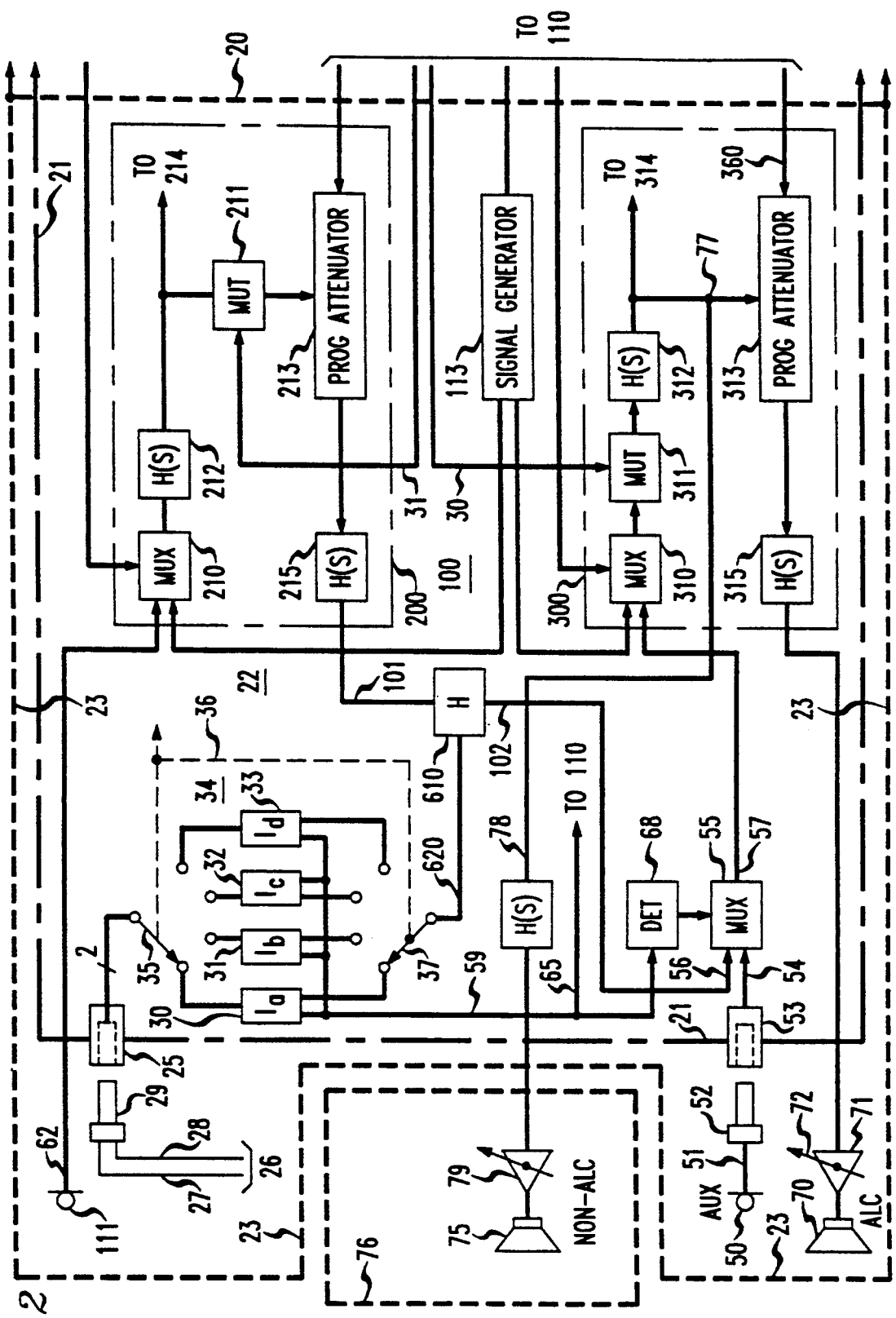
FIG. 2 is a block diagram of part of the left hand end (FIG. 1) of the FIG. 1 speakerphone as modified according to the invention hereof, FIG. 2 showing part of a system according to such invention.
Figure 3:
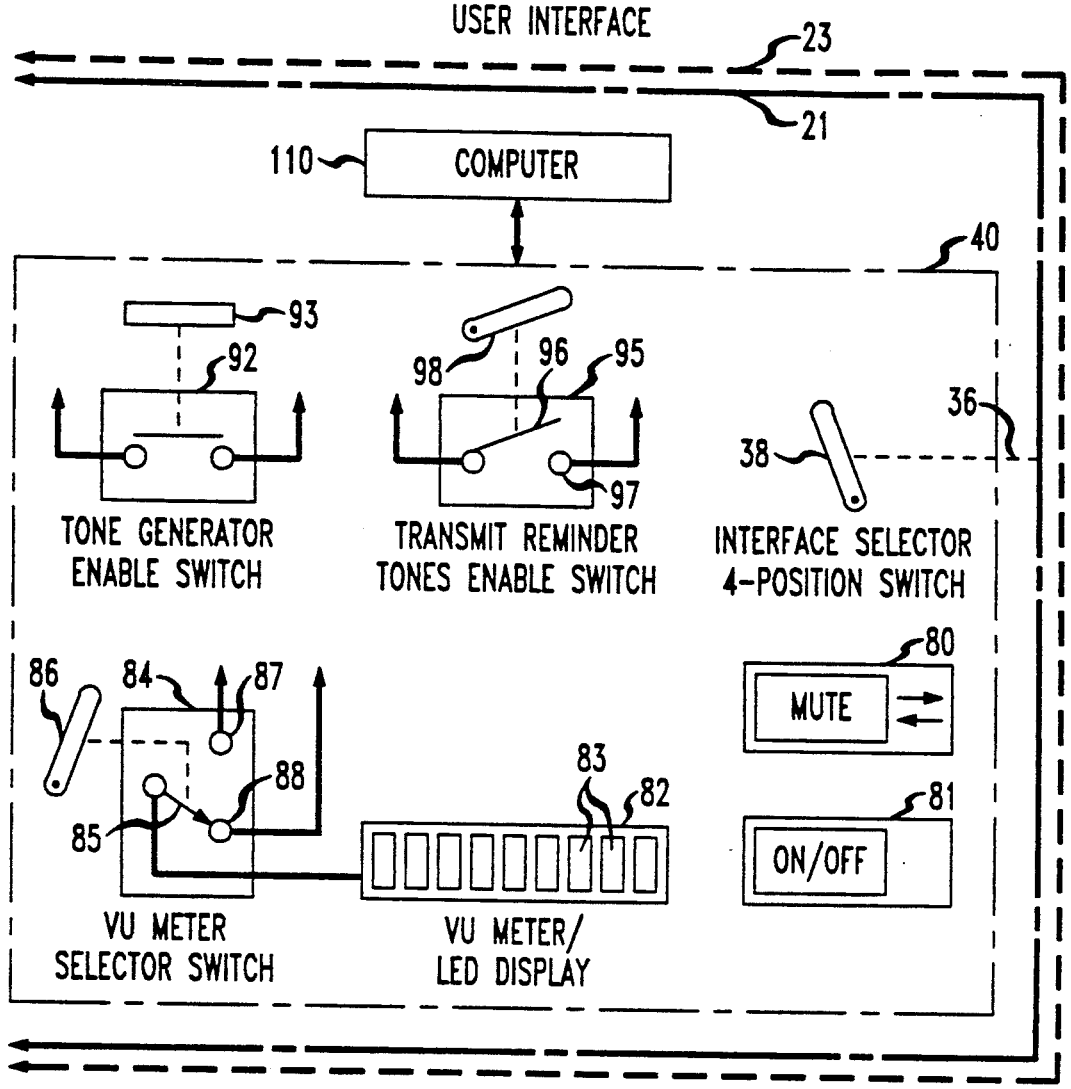
FIG. 3 is a block diagram of part of the right hand end (FIG. 1) of the FIG. 2 system.

Reference is now made to FIG. 2 which shows various improvements incorporated according to the invention hereof in the front end of the FIG. 1 speakerphone 100 earlier described. In FIG. 2, a dash line 20 represents the demarcation between that front end and the rest of the speakerphone. In the figure, the reference numeral 21 designates the housing (depicted by a dot-dash line) for the speakerphone case 22 containing much of the speakerphone circuitry. The reference numeral 23 designates an acoustic environment (depicted by a dash line) which is common to the speakerphone microphone 111 and the main speaker of the FIG. 2 system, such microphone and speaker being disposed at a local site within that environment. The case 22 may be optionally located either within or without environment 23.

Housing 21 mounts on its outside a jack 25 into which may be plugged any one of a plurality of external conductor means which are two-way signal conducting in the sense that they conduct electric signals in both directions over the same conductor(s). Such external bidirection signal conducting means or channels are adapted to couple for communication purposes the speakerphone 100 to a selected remote station disposed outside environment 23. One such channel is represented by the shown telephone line 26 which consists of tip and ring leads 27, 28 terminating in a plug 29 adapted to be selectively fitted into and removed from jack 25, and which line 26 may be coupled to a conventional telephone set. These various two-way signal conducting channels have different characteristics, and they may, for example, consist (besides line 26) of a telephone system analog station port, a telephone system dry loop port and a telephone system loop start trunk port.

Interposed between jack 25 and the connection 620 of hybrid 610 to the outside world are a plurality of interface circuits $I_a$-$I_d$ (designated as 30-33) having different electrical characteristics and adapted to match corresponding ones of the mentioned channels to the hybrid. Any selected one of these interface circuits may be electrically coupled between jack 25 and the hybrid by a multisection mechanical selector switch 34. Switch 34 has a first section comprising a movable contact 35 angularly movable by a linkage 36 to any one of a number of fixed positions and adapted at each of them to connect to jack 25 one of circuits 30-33. The same switch has a second section comprising a movable contact 37 similarly angularly movable by linkage 36 to connect to hybrid 610 the output of that interface circuit of which the input is connected through contact 35 to jack 25. While the lines connected to the inputs and outputs of circuits 30-33 are depicted in FIG. 2 as being single leads, it will be understood that these and other conductor means shown in the figures may consist of two or more leads so as, in the two lead case, for example, to have leads corresponding, for example, to the tip and ring leads of line 26.

The linkage 36 is adapted to move contacts 35 and 37 by angular movement by hand of a pivoted interface selector switch lever 38 (FIG. 3) mounted on a control panel 40 disposed on the outside of the housing 21 of the speakerphone case 22.

As another improvement feature of the FIG. 2 speakerphone, it has, in addition to its main microphone 111, an auxiliary microphone 50 which normally is (but need not be) located within the mentioned acoustic environment 23. The microphones 111 and 50 differ in that voice signals from the former are, when the speakerphone is connected to a remote station, passed through transmit section 200 and hybrid 610 to an outside communications channel to be reproduced as voice sounds at such station (i.e., not by the speakers of the FIG. 2 speakerphone). In contrast, voice signals from auxiliary microphone 50 are passed through receive section 300 to be reproduced as voice sounds by the speaker(s) of the speakerphone system. The manner in which such auxiliary voice signals are so reproduced is as follows.

The line 51 from microphone 50 terminates in a plug 52 selectively fittable into and removable from a jack 53 mounted on the outside of housing 21 of speakerphone case 22. Jack 53 is coupled to the "lower" input 54 of a multiplexer 55 having an "upper" input 56. Circuit 55 is biased to normally pass signals on its lower input. The lead 102 from hybrid 610 is connected to such upper input. The output 57 of multiplexer 55 is connected to the receive signal input of the multiplexer 310 in receive section 300. The FIG. 2 speakerphone thus differs from that of FIG. 1 in that the multiplexer 55 with its normally signal blocking input 56 is interposed in the path for receive signals between hybrid 610 and the receive section.

The selection of whether multiplexer 55 passes signal from its input 54 or its input 56 is controlled by a circuit 58 for detecting signals on a control lead 59 connected to all of the interface circuits 30-33. The operation is as follows. In the absence of there being a telephone call in progress between the speakerphone system and a remote station, there will be no signal in lead 59 and, since multiplexer 55 is biased to pass signals on its lower input, any voice signals produced by the microphone 50 will be passed through multiplexer 55 to the receive section 300 to be reproduced as sound by the speakerphone speaker(s). Assume, however, that a telephone call is initiated between the speakerphone and a remote station. For the duration of such call, whichever of interface circuits is then connected between jack 25 and the hybrid 610 will develop on lead 59 a control signal which is detected by detector circuit 58. That circuit responds to such signal to control multiplexer 55 to reject signals on its input 54 and pass signals on its input 56. Thus, so long as such telephone call is in progress the auxiliary voice signals from microphone 50 are locked out from reaching the receive section 300 which, hence, then processes exclusively the receive signals from the remote station. When, however, that call ceases, the control signal on lead 59 disappears and the multiplexer 55 reverts to passing any voice signals from microphone 50 through the receive section and to the one or more speakerphone speakers.

In reaching the lower one of such speakers (FIG. 2), those signals must first pass through the programmable attenuator 313 so as to undergo whatever signal loss (or gain) as is then set into that circuit. As later described in detail, the fact that the signals to the lower speaker must pass through attenuator 313 permits the sounds reproduced by that speaker from those auxiliary signals to be characterized by automatic level control ("ALC").

The control signal generated on lead 59 on initiation of a telephone call is supplied not only to detector circuit 58 but also, via branch lead 65 to computer 110 to switch it to an off-hook condition. In that condition, the computer is fully active and performs its calculations and control functions which have been earlier described. Such calculations include the computation of the mentioned quantity TX-N representative of the transmit noise level, i.e., the average noise level sensed by microphone 111 in environment 23, and such control functions include dynamically adjusting the attenuators 213, 313 to change the losses (or gains) imparted thereby to the voice signals passing therethrough.

The cessation of the control signal on termination of the telephone call switches computer 110 back to an on-hook condition. In that latter condition, the computer remains energized but is inactive in the sense that it no longer performs such calculations and performs such functions. In the on-hook condition, however, the computer continues to maintain the attenuators 213, 313 at the loss (gain) settings last attained thereby in the course of the immediately preceding telephone call.

In some applications it may be desirable for the FIG. 2 speakerphone to include an option which prevents the onset of telephone calls from terminating the connection of the auxiliary microphone to the one or more speakers. One way for providing such option is for the movable contacts 35 and 37 of the switch 34 to be movable to and from an extra "auxiliary preempt" position (not shown) which is to the left (FIG. 2) of the shown fixed contacts contactable by such movable contacts, and at which extra position the movable ends of these movable contacts do not make electrical contact with anything or, alternatively, are grounded. When such movable contacts are at that extra position, no telephone calls or associated signals can pass through the interface circuits 30-33. Accordingly, those circuits cannot generate on lead 59 the control signal which locks out from passing through the multiplexer 55 the auxiliary voice signals from microphone 50.

Considering now the matter of sound reproduction, in the FIG. 1 speakerphone its speaker 112 is normally (but need not be) disposed within the speakerphone case on the inside of an apertured grillwork formed in the speakerphone housing. Also, the amplifier 114 for the speaker 112 has fixed gain. The FIG. 2 speakerphone system is, however, in one of its applications, designed for use as a two-way paging system in a large size acoustic environment as, say, a factory space. For that application, the FIG. 2 speakerphone has a speaker 70 and an amplifier 71 for driving that speaker. The level of the sounds reproduced by speaker 70 is subject to automatic level control (as later described), and speaker 70 is a loudspeaker in the sense that such level at which voice signals are reproduced as sounds thereby is high enough so that such sounds are normally audible at multiple locations within environment 23 which are spaced from each other by greater than the distance over which normal speech between persons is audible. Because of such high level of sound from speaker 70, the distance between such speaker and the microphone 111 (and, also the microphone 50 if used in environment 23) is increased as compared to the microphone-speaker distance in FIG. 1 in order to avoid excessive gain around the loop depicted in FIG. 6. Alternatively, such excessive gain may be avoided, if there is only one microphone, by having that microphone take the form of two microphone elements which are mounted back-to-back on speaker 70 and have cardioid sound reception patterns facing away from each other, and which microphone elements are electrically connected in opposing relation so that there will be a balancing out of voice signals produced by the two microphone elements in response to the same sounds from speaker 70.

The amplifier 71 which drives loudspeaker 70 is a variable gain amplifier normally contained within case 22 and having a gain control knob (or other instrumentality) 72 mounted either on the amplifier housing or on the control panel 40 (FIG. 3) of the speakerphone system. The gain of amplifier 72 is adapted to be statically set by either an installer or a user of the FIG. 2 system.

In addition to the speaker 70 subject to ALC, the FIG. 2 system may include, as shown, an additional loudspeaker 75 located within its own acoustic environment 76. Environment 76 is acoustically isolated from the acoustic environment 23 of microphone 111 and loudspeaker 70. The environment 76 does not, therefore, have present therein the ambient noise of environment 23. The environment 76 may, but need not be, for example a room enclosed by sound proof walls which shields the room's interior from outside noise.

Because environment 76 is not subject to the ambient noise of environment 23 there would be no point in having the level of sounds from speaker 75 increase as such ambient noise increases. Therefore, to avoid having those sounds be subject to the automatic level control (ALC) to which the sounds from speaker 70 are subject, the voice signals which feed speaker 75 are tapped from receive section 300 at a point 77 which precedes attenuator 313. From that point, such signals are supplied by a line 78 to a high gain driver amplifier 79 for loudspeaker 75 and from that amplifier to the loudspeaker itself. Amplifier 79 normally is contained within case 22. The amplifier has a gain control knob (or other instrumentality) 80 which may be mounted on the amplifier 70 or on control panel 40 and which may be adjusted to various static gain settings for the amplifier by an installer or user of the FIG. 2 system.

Turning now to FIG. 3 which shows aspects of other improvements incorporated in the FIG. 2 system, the control panel 40 has mounted therein a MUTE switch (also present in the FIG. 1 system) operated by a slide button shiftable between a left position and a right position at which the switch actuates computer 110 to cause MUTE circuits 211, 311 to permit and prevent, respectively, the conduction of signals therethrough. Another ON/OFF switch has on panel 40 a manually depressible button 81 which is spring loaded to normally be in outward position. Such switch is employed by the user of the FIG. 2 system to make outgoing telephone calls. A first depression of the button 81 initiates such a call which becomes self-held when the button is thereafter released. A second depression of the button 81 terminates that call. Outgoing calls so initiated by manipulation of button 81 have the same effect with respect to the described creation and cessation of a control signal on lead 59 (FIG. 2) as do telephone calls initially incoming to the FIG. 2 system.

Further included on the control panel 40 is a VU meter 82 provided by an array of similar rectangular vertically elongated light emitting diodes 83 ("LED's") which are spaced in side-to-side relation along, and vertically bisected by, a common horizontal axis. Diodes 83 are electrically connected to respond to signals applied to the meter 82 to collectively produce luminous bar displays of variable lengths (from the array's left hand end) which represent in dB or absolute value the respective magnitudes of such signals. Signals representing various quantities may be so applied to meter 82 by a meter selector switch 84 comprising a movable contact 85 electrically fixedly connected to meter 82 and positionable by movement by hand of a selector lever 86 on panel 40 to selectively contact any one of a plurality of fixed contacts electrically coupled to computer 110 and represented in FIG. 3 by contacts 87 and 88. These fixed contacts 87, 88 may be, by way of example, without restriction, have supplied thereto signals from computer 110 representative of the average level of, respectively, receive signals reproduced as sound by the FIG. 2 system, and the ambient noise in environment 23 in which such signals are reproduced as sound by loudspeaker 70. The meter 82 will then respond to shifting of selector lever 86 to provide luminous bar displays of either such average signal level or such average noise level.

A description has earlier been given of how the FIG. 1 speakerphone system automatically calibrates itself to take into account the acoustics of the environment in which that system operates. That automatic self-calibration takes place each time the system is energized (as, for example, when it is first installed or is subsequently re-energized after being de-energized for some reason). During each such calibration, the system obtains information on the acoustics of its environment by generating by its calibrator circuit 113 and automatically emitting by its speaker 112 a single train of sound tones of which each tone is of single frequency and lasts eight milliseconds, but which individual tones in the train are of progressively increasing frequency over the duration of the entire train of tones. The acoustic response of such environment to such single train of tones is detected by microphone 111 and converted by it into signals which are fed to computer 110 to become a factor affecting the calculations and control functions performed thereby. In the FIG. 1 system, however, the production of the single train of tones is entirely automatic and is not under the control of the user of the system.

In the FIG. 2 system in contrast, the system not only automatically produces such single train of sound tones as described above but, also, is capable, at the option of the system user, of being actuated to produce under manual control successive reiterations of such train so as to generate a sequence of sound tone trains over a time period lasting as long as desired by the user.

Figure 12:
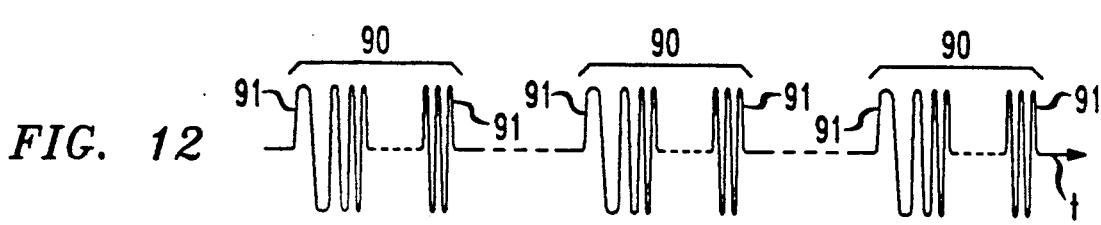
FIG. 12 is a schematic diagram in the time-amplitude domain of successive tone bursts which may be used, according to the invention, by an installer as an aid in adjusting systems according to the invention.

FIG. 12 depicts such a sequence in which a succession of identical trains 90 of sound tones appear in time separated relation, and in which each train 90 consists of a group of sound tones which are each of a single frequency but which, among each other, increase in frequency with increase in time.

Any such sequence of time separated identical sound tone trains is "called out" from the FIG. 2 system by the use of a tone generator enable switch 92 adapted to be actuated by a manually depressible button 93 mounted on panel 40 and spring biased to be normally in outward position. When button 93 is first depressed, the switch 92 is actuated to signal computer 110 to control signal generator 113 to produce tone signals which are reproduced by the speaker 70 as successive intermittent reiterations of the mentioned single sound tone train. The computer 110 will continue to cause such reiterations until button 93 is depressed again to indicate to the computer to thereby end the period of generation of such sound tone trains. An effect of the continuance of such period is to disable the computer 110 from responding to the trains of sound tones so generated.

Thus, it is possible by manipulation of the switch button 93 for the user of the FIG. 2 system to cause its speaker 70 to project into environment 23 a succession of tone separated sound tone trains of the kind described over a tone period selected by that user. While, as stated, the response of such environment to these manually induced sound tone trains is not utilized to affect the operation of computer 110, these trains nonetheless have a useful purpose in that the sounds in these trains are clearly audible to an installer and can be used by that person, when installing or partly relocating the system, as an aid in making adjustment thereto as, say, the setting of the static gain provided by amplifier 71.

The FIG. 2 speakerphone system is also adapted at the option of the user to generate a reminder or warning signal which is reproduced as sound by speaker 70, and which reminds persons in environment 23 that the system is "on" and is capable of transmitting what they say to another party who has activated the system by placing a telephone call thereto.

The possibility of automatically activating the FIG. 2 system when unattended by a telephone call from a remote station is considered a desirable feature of the system because it, say, permits persons in the same building as the FIG. 2 system to use the unattended system for paging purposes. If however the system has that feature, then it is desirable that the system sound the mentioned reminder signal in the instance where the system is in an "on" state permitting transmission of sound therefrom to such station.

Figure 13:
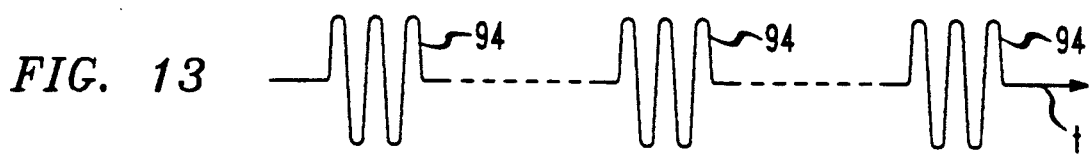
FIG. 13 is a schematic diagram in the time-amplitude domain of bursts of a single frequency tone which may be used according to the invention as a reminder that the system with which the tone is used is "on".

The mentioned reminder signal is shown in FIG. 13 and consists of a tone burst 94 reproduced as sounds by speaker 70 and separated from each other by, say, thirty (30) second time intervals. Each of such tone burst consists of a tone having a single frequency. The cutting in and out of such reminder signal is effected by a switch 95 comprising a movable contact 96 adapted to open and close with a fixed contact 97 by the shifting by hand of a pivoted switch control lever 98 on panel 40. The reminder signal is initiated by moving lever 98 down to close contact 96 with contact 97 to make a connection which signals computer 110 to control signal generator 113 to produce an electrical signal converted by speaker 70 into the mentioned of tone burst. So long as movable contact 96 is closed with fixed contact 97, those tone bursts will be generated and can be heard by the casual listener independent of whether or not the FIG. 2 system is attended by a person assigned to operate it. The single tone bursts can, of course be terminated by moving switch lever 98 up to produce an open between contacts 96 and 97.

The improvements so far disclosed in detail have been improvements in apparatus or in apparatus together with method. We turn now to a most important improvement, according to the invention, which is an improvement in method and which involves the signal or quantity designated herein as TX-N and representative of the average level of the audio frequency ambient noise present in the common acoustic environment 23 of the microphone 111 and the speaker 70.

Considering in further detail the derivation of TX-N, the acoustic energy in environment 23 comprises two components in the audio frequency range, namely, a first component constituting audible ambient noise which is continuously present, and a second component constituting voice sounds which are present from time to time in environment 23. Those voice sounds may be subdivided into (a) the voice sounds directly detected by the microphone from people located in environment 23, (b) the sounds reproduced by speaker 70 of the voices of persons at remote stations in communication with the speakerphone system serving environment 23, and (c) voice sounds which are initiated by people in that environment and are originally picked up by microphone 111 and converted by it into electric signals, but a fraction of which signals "leak" in the FIG. 6 loop through hybrid 610 to be reproduced by speaker 70 as voice sounds, and to constitute feedback in such loop. Of course voice sounds and signals which are feedbacks may make more than one pass around that loop, but the parameters of that loop are controlled by computer 110 so that the loop gain will not exceed 1.0 so as to cause singing.

Because microphone 111 senses these first and second components in the acoustic energy in environment 23, the electric signal derived from microphone 111 from such sensing is a composite signal also comprising first and second components representative of, respectively, ambient noise in said environment and voice sounds present therein and possibly of multiple origin as set out above.

As earlier described, that composite signal is electrically analyzed to provide a differential electrical response to its first and second components. That is, such electrical analysis is conducted by the use of two equations earlier set out, and of which the first employs an averaging technique which tends to pick out peaks in the component signals so as to yield a quantity which is primarily a measure of the second "voice" component of the composite signal. It is, however, the second of the equations earlier set out which is of interest in relation to the improvement now being described.

Examining that second equation closely, it will be evident from it that the processing of the composite signal in accordance with it is as follows. First the preliminary steps earlier described are carried out of detecting the signal envelope of the composite signal and of obtaining, by analog-to-digital conversion, digital samples of magnitude values of such signal.

After those preliminary steps, the processing continues by deriving a running average of the value of ones of such samples up to the next sample to occur, changing the value of such average upon occurrence of such next sample to reflect its value in such average by obtaining the difference between the absolute value of such next sample, and the value of such running average, adding to such running average value, when such difference is positive, the value of such difference when multiplied by a first weighting factor, adding to such running average value, when such difference is negative, the value of such difference multiplied by a second weighting factor much greater than such first factor, and obtaining by the foregoing steps an electrical quantity which is a representation of said running average value as so continuously updated by such additions thereto of said differences as they occur. All of such post-preliminary steps are carried out by computer 110. The quantity just mentioned is the transmit noise quantity TX-N.

From inspection of the mentioned second equation, it will be evident that the first weighting factor referred to has the value 1/4096 whereas the second weighting factor has the value ¼. That is, the first factor has a value more than a thousandfold less than the value of the second factor. An effect of such difference is that, among the rapidly occurring changes in peak magnitude induced in the signal envelope of the composite signal almost entirely by its voice component, the value of TX-N will respond only very slowly to those of such changes which are rises or constitute a rising trend, but the TX-N value will respond quickly to those of such changes which are negative or constitute a falling trend in magnitude. A consequence of this asymmetry of the TX-N response (which asymmetry is due to such difference of such weighting factors) would be that, if the composite signal were to be comprised only of its voice component, the value of TX-N would almost always hover at or close to zero. The fact is, however that the composite signal under consideration also includes its component corresponding to the ambient noise in environment 23, and the level of that ambient noise tends over time to remain constant or to change only slowly. Because of the inclusion of that noise component in the composite signal, the value of TX-N will be sustained by that component and be determined almost entirely by the average magnitude of the ambient noise in environment 23, only minor and relatively insignificant fluctuations in such value being caused by the presence in the composite signal of the voice component. It can properly be said, therefore, that TX-N is a quantity with a value which is a relatively significant measure of the average level of such noise (the "transmit noise average"), while being relatively unaffected by the presence or absence of voice sounds in such environment. The value of TX-N will however increase in step with and accurately reflect a rise in the ambient noise level when, as usual, such a rise occurs slowly. Moreover, the value of TX-N will fall in step with a fall in such noise level.

In the FIG. 1 speakerphone system, the quantity TX-N is, as described, calculated by computer 110 and stored in its memory. Then, it is on an ongoing basis, compared in the computer with the transmit signal average TX-S, as shown in FIG. 8, in the course of reaching decisions by the computer of whether the system should remain in the state it is then in or switch to another state. Such a decision calling for a change in state is executed by the computer sending command signals to the attenuators 213, 313 to introduce into the signal paths through transmit and receive sections 200 and 300 amounts of losses respective to these sections which are appropriate to change the operation of the system from one state to another. In the FIG. 1 system, the quantity TX-N is not utilized as a factor which is determinative of the amount of loss or gain (or the amount of change of loss or gain) introduced into the signal path in the receive section 300.

In contrast, in the FIG. 2 speakerphone system, the quantity TX-N is utilized as one factor among others which are determinative of the loss or gain introduced by attenuator 313 in the path through receive section 300 for signals passing through the attenuator to speaker 70 to be reproduced as voice sounds by it. More specifically, in the FIG. 2 system (as in the FIG. 1 system) the computer 110 operates through its output line 360 on programmable attenuator 313 to control the signal losses provided by it for the purposes of switching the system from one state to another, calibrating the system, and so on. The values of such losses are not, however, functionally related in magnitude to the value of the transmit noise average or other of the signals or quantities described heretofore as involved in the normal operation of the FIG. 2 system. In the FIG. 2 system, in addition to controlling such non-magnitude related losses, the computer 110 superposes on such losses a gain which is functionally related in magnitude to one of such quantities, namely the transmit noise average. Such superposition is effected as follows.

The computer derives a control signal from the quantity TX-N calculated by the computer. Such control signal is supplied by line 360 or otherwise to the programmable attenuator from the computer to control the attenuator losses. The effect of such control signal on the attenuator is to dynamically adjust, as a function of the magnitude of the quantity TX-N (and, hence, of the average level of the audible ambient noise in environment 23), the gain provided in the receive section for signals passing through the attenuator to speaker 70, such gain being superposed on the attenuator losses. The functional relationship between the dynamically adjusted gain and such noise level is such that the gain increases as that noise level increases and conversely. It follows from the existence of such functional relation that, when that noise level increases, the average level of the reproduced voice sounds also increases. Therefore, in the face of an increase in noise level the intelligibility of the reproduced sounds will not be lost. On the other hand, if the average noise level in environment 23 decreases, the average level of the reproduced sounds will correspondingly decrease in a manner which preserves the intelligibility of the sounds but avoids their seeming to be unduly loud.

Figure 11:
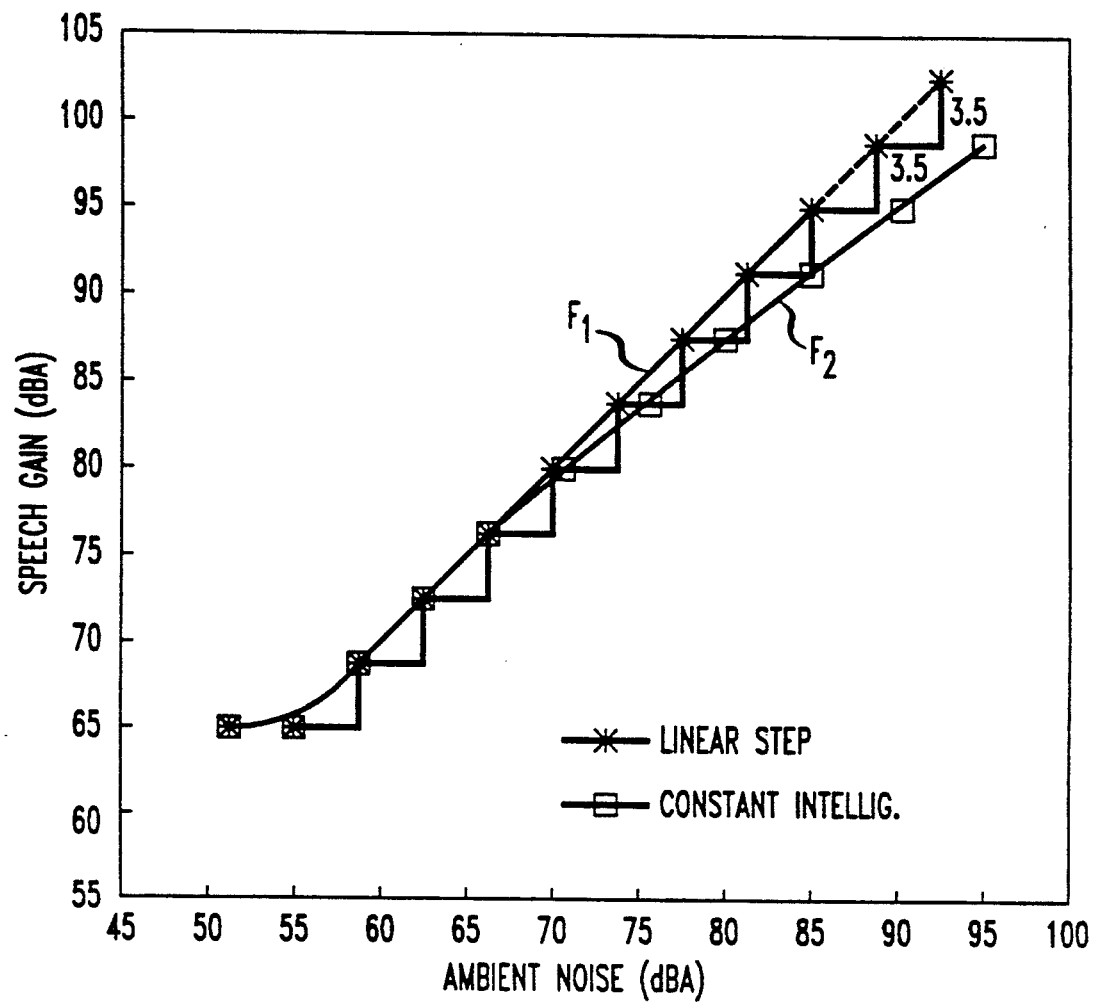
FIG. 11 is a diagram graphing the gain obtainable in the electrical receive section in which various gain setting points may be automatically selected as a function of such average ambient noise level, the graphed lines in such diagram relating the level of the voice sounds reproduced in such environment to such noise level.

FIG. 11 is a graphical diagram in which functional relationships between the change in ambient average noise level in environment 23 and the responsive dynamic change in gain effected in attenuator 313 are plotted in vertical and horizontal coordinates representing gain and noise level, respectively. For both coordinates, the scale used to represent changes in the related quantity is in dB. The value of the gain as a function of the value of the noise level is plotted as a line which may be either straight or curved.

In FIG. 11, two gain-noise functions are plotted. The first is represented by the straight line $F_1$, and second by a curve $F_2$ which decreases in slope with increase in noise level. Both of lines $F_1$ and $F_2$ are smoothed line approximations to the stepwise functional relation between gain and noise which actually occurs in attenuator 313 because the changes in the losses (gains) provided thereby occur in 3.5 dB steps.

In FIG. 11 with its vertical and horizontal scales in dB, the line $F_1$ has a constant 45° slope. The significance of that 45° slope is that, when the function $F_1$ is plotted as shown in the graphical diagram of FIG. 11 against vertical and horizontal coordinates having scales of which the spacings between the scale numbers or other markings are directly proportional to the actual magnitudes of the represented quantities, then the function $F_1$ may correspond to any of a number of plotted lines which have various constant slopes, but which will be straight lines representing a linear relationship between changes in the average noise level in environment 23 and the resulting changes in the dynamic gain of attenuator 313 produced by computer 110 in response to those changes in noise level.

When, however, the function which is plotted in FIG. 11 is non-linear, then that function will not be represented by a straight line when plotted in FIG. 11. Instead as represented by the plot in that figure of the function $F_2$, it will, when plotted to the coordinate scales used in FIG. 11, be in the form of a curve.

With regard to the particular gain-noise function to be used in relating the average level of sounds reproduced by speaker 70 to the average level of the ambient noise in environment 23, it is satisfactory to use a functional relation of which function $F_1$ is exemplary and the effect of which is, as shown for function $F_1$ to establish a linear relationship between changes in the magnitude on an absolute scale of the average reproduced sound level and changes in the magnitude on a absolute scale of the average noise level. We have found, however, that as the average noise level increases it is not necessary, in order to maintain constant intelligibility of the reproduced sounds, for the average level of such sound to rise in strict proportion to the noise level increase. Rather, we have found as a surprising result that, as represented by curve $F_2$ in FIG. 11, constant intelligibility of the reproduced sounds can be maintained, even as average noise level increases, if the ratio of the increase of the average reproduced sound level to such average noise level gradually declines with increase in such level. To state the relationship another way, as such noise level increases, the function relating the average level of the voice sounds reproduced by speaker 70 (or, alternatively, the value of the dynamic gain provided by attenuator 313 for voice signals passing therethrough) is, when plotted in vertical and horizontal ordinates having absolute magnitude scales as in FIG. 11, desirably represented (as exemplified by line $F_2$) by a curve which has a slope which is positive but which decreases with increasing noise level. In any particular use, however, the value of such slope and its rate of decrease is implementation-dependent.

The dynamic adjustment in gain of programmable attenuator 313 will take place in the course of each telephone call made between the FIG. 2 system and a remote station. Accordingly, during that call, the average level of the sounds reproduced by speaker 70 will be higher or lower in relation to a reference value therefor when the average level of the audible ambient noise in environment 23 is, respectively, higher or lower than a reference value therefor. Moreover, if the average level of such noise increases or decreases during such call, the average level of the sounds reproduced by speaker 70 will correspondingly increase or decrease. That is, such sounds will be characterized by the feature of automatic level control ("ALC").

What has been just been said is not true of the sounds reproduced by speaker 75 because the voice signals from such speaker do not pass through attenuator 313 in the course of being transferred through receive section 300 to speaker 75. Thus, the level of the sounds from the speaker 75 is independent of the ambient noise level in environment 23. Such independence is a desirable feature because it prevents the occurrence of changes in the level of sounds reproduced by speaker 75 in environment 76 which (changes) have no relation to the noise level in that environment or to any other acoustic aspect thereof.

Although the voice signals from auxiliary microphone 50 pass through attenuator 313 in reaching speaker 70, the level of the voice sounds reproduced by that speaker from those signals does not vary with the noise level existing in environment 23 during the period such voice signals pass to speaker 70. That is so because, it will be recalled, the computer 110 is on hook during such period so as not to be up-dating the quantity TX-N. As earlier described, however, even though computer 110 is on-hook during such period, the attenuator 313 retains therein the value of gain last set therein in the course of the telephone call next preceding the considered transmission of the auxiliary voice signals from microphone 50 to speaker 70. Hence, the level of the sounds reproduced from those voice signals will have a functional relation to the level existing at the end of such call of the ambient noise in environment 23, and will vary directly from call to call with that end-time noise level. The functional relationship existing in between telephone calls for auxiliary voice sounds between their actual sound level and the noise level of the last preceding telephone call will of course, be the same as the functional relation existing during telephone calls between the sound level of the receive signal from the remote station and the then current noise level in environment 23.

Figure 10:
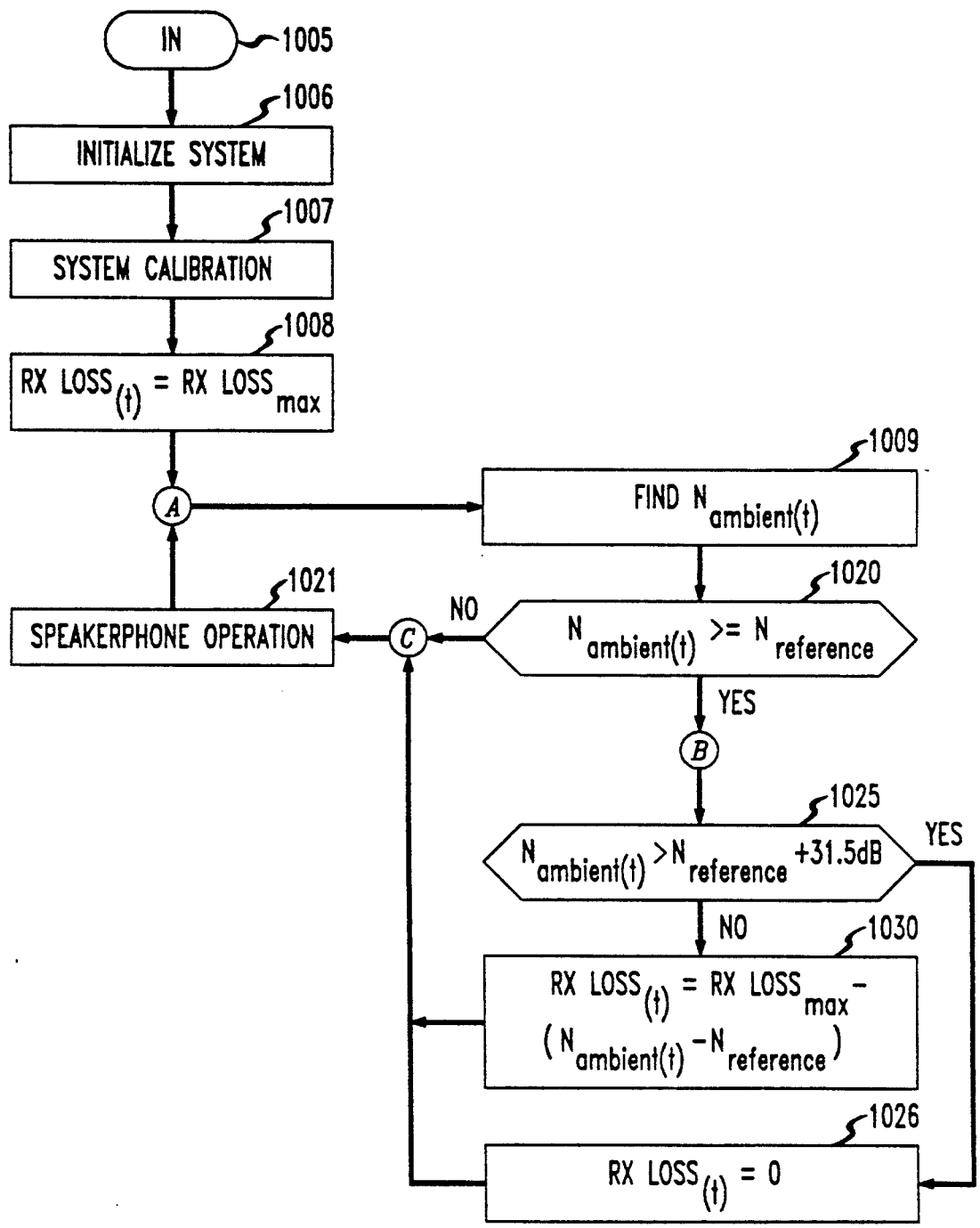
FIG. 10 is a flow chart pertaining to controlling in the FIG. 2 system the level of sound of received signals reproduced by a handsfree speaker in an acoustic environment as a function of the average ambient noise level determined as existing in such environment.

FIG. 10 is a flow chart depicting steps and decisions occurring in the process utilized in the FIG. 2 system to obtain automatic level control. Starting consideration of the process at point 1005, as a first step 1006 the system is initialized in the sense that various conditions and parameters of the hardware-software are established or set to prepare the system for subsequent utilization. From step 1006 the process proceeds to the system calibration step 1007 which has already been described.

Following system calibration, in step 1008, the programmable attenuator 313 in receive section 300 is set by computer 110 so that at time t (where t in this step is time zero) to provide the maximum possible loss and minimum possible gain of which attenuator 313 is capable. That minimum gain which is set in attenuator 313 corresponds to a 65 dB value of the level of the sounds reproduced by speaker 70. It has been found that such 65 dB level provides satisfactory sound reproduction in environments of the reproducing speaker when the average level of the ambient noise in that environment in 55 dB or less. That correlation between such 65 dB sound level and such 55 dB noise level is shown at the lower ends of the function lines $F_1$ and $F_2$ shown in FIG. 11.

The steps described so far precede the shown junction A and are undertaken for the purpose of setting up the FIG. 2 system. When those steps have been completed, the process moves on to step 1009 which is the step for calculating on an ongoing basis the quantity or indication TX-N in the manner previously described.

Following that step is a yes-no decision 1020 undertaken with respect to TX-N (such quantity being referred to in FIG. 10 as $N_{ambient(t)}$). The decision is whether or not TX-N is greater or equal to a 55 dB reference level for noise or is less than that 55 dB level.

If the answer is "no," process moves directly to junction C and the speakerphone operation step 1021 so as to have the FIG. 2 system operate in a mode which is represented by reiterated circulation around the loop including junctions A and C and parts 1009, 1020 and 1021 of the process, and in which mode the reproduced sound level remains at 65 dB unless and until circulation around such loop is interrupted by the noise level rising above 55 dB.

On the other hand, if the answer to the mentioned decision is "yes," the process moves to junction B and then to decision 1025 where it is determined whether or not TX-N is greater than the reference noise level plus 31.5 dB or, in other words, 86.5 dB. It will be noted that such 31.5 dB figure corresponds to the greatest range of dB change which can be effected by the use of the nine 3.5 dB gain or loss steps affordable by appropriate setting of attenuator 313.

If the answer to the question relevant to decision 1025 is "yes," then the process moves to step 1026 at which the attenuator 313 is set for minimum loss or, to phrase it alternatively, for maximum gain.

For the circumstance, the FIG. 2 system has a mode of operation in which the average level of the reproduced sound has reached an upper threshold corresponding to such 86.5 dB figure and beyond which it can go no higher despite any further increases which may occur in TX-N. The provision for that upper threshold is necessary in order to prevent excessive gain occurring around the loop shown in FIG. 6. The mode of operation just mentioned can be envisaged as reiterative circulation around the loop comprising junction A and parts 1009, 1020, 1025, 1026, and 1021 until such time, if any, as TX-N drops below 86.5 dB.

If, on the other hand, the answer to the making of decision 1025 is "no," then the process moves to step 1030 at which the computer 110 as an ongoing basis sets the attenuator 313 to have a loss equal to its maximum loss minus an amount which is a function of the difference between TX-N and the 55 dB reference noise level. Such setting of the attenuator is equivalent to adjusting its gain as either a function $F_1$ or a function $F_2$ (FIG. 11) of TX-N or, what is approximately the same, the average level of the audible ambient noise sensed by the FIG. 2 system as existing in environment 23. That is, if the FIG. 10 process arrives at step 1030, the FIG. 2 provides the automatic level control ("ALC") which has been described, and the operation of the system can be envisaged as reiterative circulation around the loop comprising function A and parts 1009, 1020, 1025, 1030 and 1021 of the process.

The above-described embodiments being exemplary only, it is to be understood that additions thereto, omissions therefrom and modifications thereof can be made without departing from the spirit of the invention. Thus, while the invention has been described in terms of the FIG. 2 system which has been disclosed as a two-way communication system with loudspeakers usable for making paging announcements in a large space such as a factory, it will be evident that the invention (and, particularly, the ALC feature thereof) is useful in other applications. For example, it is noted that ALC according to the invention has a most useful application in two-way voice communication systems in the form of cellular telephone systems to increase the level of sounds reproduced in a vehicle as the level of noise in such vehicle increases.

Accordingly, the invention is not to be considered as limited same as is consonant with the recitals of the following claims.

We claim:

1. The improvement in two-way voice telecommunications apparatus comprising a hands-free speaker and a first hands-free microphone disposed at a local site in a common acoustic environment, housing means, signal processing means in said housing means and comprising receive and transmit sections electrically preceding and succeeding, respectively, said speaker and said microphone, said receive section having an input and being adapted to process and then supply to said speaker electrical signals received at said input and originated at a remote station outside said environment and representative of voice sounds at said station ("receive signals"), and said transmit section having an output and being adapted to process and then supply to said output, for transmission to said station, electrical signals originated at said microphone and representative of voice sounds in said environment ("transmit signals"), first and second loss stages in, respectively, said receive section and said transmit section and responsive to computer control to produce in said receive and transmit signals respective signal losses of selected variable value called for by such control, and a computer coupled to said two stages and responsive to, among other factors, information from said microphone to dynamically adjust the losses respectively produced thereby so as to switch the state of operation of said apparatus between at least transmit and receive states, and said improvement being that said acoustic environment served by said speaker is large, said speaker is a loudspeaker adapted to project into said environment paging announcements and other voice sounds audible in said environment at multiple locations separated from each other by more than the normal hearing distance for the normal spoken human voice, and said improvement also comprising a second auxiliary hands-free microphone disposed in said environment for converting voice sounds therein sensed by said electrical auxiliary microphone into electrical auxiliary voice signals, switch means for selectively effecting a connection of said electrical auxiliary voice signals to said receive section for passage therethrough to said loudspeaker, and means responsive to receive signals incoming to said receive section to disable such connection such that said electrical auxiliary voice signals do not reach said loudspeaker and only said receive signals pass through such section to said loudspeaker.

2. The improvement according to claim 1 in which said computer is responsive to, among other functions, information from said receive section to dynamically adjust the loss respectively produced by said two loss stages, and in which said improvement further comprises means operable when said auxiliary microphone is connected to said receive section to render said computer non-responsive to such information when it is derived from auxiliary voice signals transferred through such receive section.

3. The improvement in two-way voice telecommunications apparatus comprising a first hands-free speaker and a hands-free microphone each disposed at a first local site in a common acoustic environment, housing means, signal processing means in said housing means and comprising receive and transmit sections electrically preceding and succeeding, respectively, said speaker and said microphone, said receive section having an input and being adapted to process and then supply to said speaker electrical signals received at said input and originated at a remote station outside environment and representative of voice sounds at said station ("receive signals"), and said transmit section having an output and being adapted to process and then supply to said output, for transmission to said station, electrical signals originated at said microphone and representative of voice sounds in said environment ("transmit signals"), first and second loss stages in, respectively, said receive section and said transmit section and responsive to computer control to produce in said receive and transmit signals respective signal losses of selected variable value called for by such control, and a computer coupled to said two stages to dynamically adjust the losses respectively produced thereby so as to switch the state of operation of said apparatus between at least transmit state and receive states, and said improvement comprising a second hands-free auxiliary speaker disposed at a second local site acoustically isolated from said acoustic environment which includes said first local site, and switch means for selectively effecting a connection of said auxiliary speaker to said receive section between the input of said receive section and said loss stage therein such that said auxiliary speaker is supplied with receive signals incoming to said receive section without such signals passing through such loss stage to thereby be exposed to the signal losses produced by such stage.

4. The improvement in two-way voice telecommunications apparatus comprising a hands-free speaker and a hands-free microphone disposed at a local site in a common acoustic environment, an amplifier with manually settable gain preceding such speaker, housing means, signal processing means in said housing means and comprising receive and transmit sections electrically preceding and succeeding, respectively, said amplifier and said microphone, said receive section having an input and being adapted to process and then supply to said amplifier and speaker electrical signals received at said input and originated at a remote station outside said environment and representative of voice sounds at said station ("receive signals"), and said transmit section having an output and being adapted to process and then supply to said output, for transmission to said station, electrical signals originated at said microphone and representative of voice sounds in said environment ("transmit signals"), first and second programmable attenuators in, respectively, said receive section and said transmit section and responsive to computer control to be adjusted to respective loss settings therefor so as to produce in said receive and transmit signals respective signal losses of selected variable value called for by such control, a computer coupled to said two programmable attenuators and responsive to, among other factors, information from said microphone to derive from said information two separate indications which are direct measures of, respectively, the average level of ambient noise in said environment, and the average level in said environment of voice sounds present from time to time in said environment, and to dynamically adjust the respective loss settings of said two programmable attenuators so as to switch the state of operation of said apparatus between at least transmit and receive states, and said improvement being that said computer is responsive to said first indication while being substantially unresponsive to said second indication to be further operable on only said first programmable attenuator in said receive section to reset that attenuator to dynamically adjust the signal loss produced by such programmable attenuator in receive signals as a function of such noise level so as to cause voice sounds reproduced by said speaker from such signals to, over a range, increase in average level when such noise level increases and decrease in average level when such noise level decreases.

5. The improvement in the method comprising, providing at a local site a hands-free speaker and microphone in a common acoustic environment for utilization of said speaker and microphone, respectively, to reproduce as sound in said environment electrical voice signals received from a remote station outside said environment ("receive signals") and supplied to said speaker, and to reproduce voice sounds of people at said site as electrical voice signals to be transmitted to said station ("transmit signals"), electrically processing said receive and transmit signals before being applied to said speaker and transmitted to said station, respectively, by passing them through an electrical receive section and an electrical transmit section, respectively, providing a computer, utilizing said computer to electrically control the processing of said receive and transmit signals in, respectively, said receive and transmit sections so as to dynamically adjust losses produced in such sections in such signals therein and so as to switch the state of operation of the systems comprising the aforementioned components between at least transmit and receive states, providing a tone signal generator, and automatically calibrating said system upon each energization thereof with electricity by inducing said computer to control said generator in response to said energization to produce a burst of signals representative of tones of different frequency, supplying said signal burst to said speaker to be reproduced thereby as a burst of sound tones projected into said environment, detecting by said microphone the return lines produced in sound environment by such sound tone burst, and supplying the electric signals produced at said microphone from said echos as inputs to said computer to cause said losses in said sections to be automatically adjusted through control by said computer so as to calibrate such system for the acoustic parameters of said environment, and said improvement comprising, initiating and continuing under manual control of a person a signal fed to the computer to induce it to control said tone generator to produce over a time interval determined by that person a succession of such signal bursts reproduced by said speaker as a corresponding succession of bursts of sound tones projected into said environment and usable by an installer of said system to adjust one or more operating parameters thereof.

6. The improvement in the method comprising, providing at a local site a hands-free speaker and microphone in a common acoustic environment for utilization of said speaker and microphone, respectively, to reproduce as sound in said environment electrical voice signals received from a remote station outside said environment ("receive signals") and supplied to said speaker, and to reproduce voice sounds of people at said site as electrical voice signals to be transmitted to said station ("transmit signals"), electrically processing said receive and transmit signals before being applied to said speaker and transmitted to said station, respectively, by passing them through an electrical receive section and an electrical transmit section, respectively, providing a computer, utilizing said computer to electrically control the processing of said receive and transmit signals in, respectively, said receive and transmit sections so as to dynamically adjust losses produced in such sections in such signals therein and so as to switch the state of operation of the systems comprising the aforementioned components between at least transmit and receive states, providing a tone signal generator, and automatically calibrating said system upon each energization thereof with electricity by inducing said computer to control said generator in response to said energization to produce a burst of signals representative of tones of different frequency, supplying said signal burst to said speaker to be reproduced thereby as a burst of sound tones projected into said environment, detecting by said microphone the return lines produced in sound environment by such sound tone burst, and supplying the electric signals produced at said microphone from said echos as inputs to said computer to cause said losses in said sections to be automatically adjusted through control by said computer so as to calibrate such system for the acoustic parameters of said environment, and said improvement comprising, initiating and continuing under manual control of a person a signal fed to the computer to induce it to control said tone generator to produce a single frequency tone occurring intermittently in successive bursts of such tone and adapted to remind listeners that such system is in active operation.

7. The method comprising, providing at a local site a hands-free speaker and hands-free microphone in a common acoustic environment for utilization of said speaker and microphone, respectively, to reproduce as sounds in said environment electrical voice signals received from a remote station outside said environment ("receive signals") and supplied to said speaker, and to reproduce voice sounds of people at said site as electrical voice signals to be transmitted to said station ("transmit signals"), electrically processing said receive signals before they are applied to said speaker by passing them through an electrical receive section, developing via said microphone from audio acoustic energy in said environment an electrical composite signal comprising first and second components representative of, respectively, ambient noise in said environment and voice sounds present from time to time in said environment electrically analyzing said composite signal to provide a differential electrical response to said components which discriminates in favor of and against, respectively, such first and second components, and to derive from such response a control signal which is a relatively significant measure of the average level of said noise (the "transmit noise average"), and is relatively unaffected in value by the presence or absence of such voice sounds, and dynamically adjusting as a function of the value of said control signal the gain provided in said receive section for said receive signals so as, over a range, to increase and decrease the value of such gain when, respectively, said noise level increases and said noise level decreases, such dynamic adjusting of said gain superposing upon the gain of such receive section, as determined by other factors, a dynamic change in gain which is a function of a corresponding change in such average ambient noise level, such function being representable by a line graphed in vertical and horizontal coordinates having scales proportional to magnitude and representing such gain change and noise level change, respectively, and such line being in the form of a curve which is representative of constant intelligibility of said reproduced sounds with increasing ambient noise level, and the slope of which curve decreases with increase in noise level.

* * * * *